United States Patent
Niizuma

(10) Patent No.: US 8,866,429 B2
(45) Date of Patent: Oct. 21, 2014

(54) DEVICE AND METHOD FOR POWER-SAVING DRIVING OF DEVICE HAVING SAME LOAD PATTERN

(75) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 74 days.

(21) Appl. No.: 13/259,215

(22) PCT Filed: Mar. 1, 2010

(86) PCT No.: PCT/JP2010/053202
§ 371 (c)(1),
(2), (4) Date: Sep. 23, 2011

(87) PCT Pub. No.: WO2010/110013
PCT Pub. Date: Sep. 30, 2010

(65) Prior Publication Data
US 2012/0019184 A1 Jan. 26, 2012

(30) Foreign Application Priority Data

Mar. 24, 2009 (JP) .................................. 2009/072523
Aug. 5, 2009 (JP) .................................. 2009/182434

(51) Int. Cl.
*G05B 11/28* (2006.01)
*H02P 27/08* (2006.01)

(52) U.S. Cl.
CPC ........................................ *H02P 27/08* (2013.01)
USPC ........ 318/599; 318/650; 318/400.3; 318/139; 318/808; 363/51; 363/35

(58) Field of Classification Search
CPC ............ H02P 21/0089; H02P 2207/03; H02P 25/021; H02P 25/02; H02P 27/06; H02P 7/29; H02P 6/085; B60K 1/02; B60K 6/26; B60K 6/48; B23K 7/102; B60H 1/00835; B66C 13/22; B66D 3/18; F02D 13/02; Y02T 10/7005; Y02T 10/7241; B60L 11/1803; B60L 2210/40; G05B 11/28; G05B 2219/42237; G05D 3/18; H02J 9/005; H03K 3/012

USPC ........ 318/494, 811, 807, 810, 803, 801, 805, 318/729, 700, 400.13, 400.34, 400.35, 318/400.37, 400.38, 432, 139, 798, 799, 318/800; 363/35, 37, 79
See application file for complete search history.

(56) References Cited

U.S. PATENT DOCUMENTS 4,328,454 A * 5/1982 Okuyama et al. ............. 318/803
4,788,485 A * 11/1988 Kawagishi et al. ........... 318/811
(Continued)

FOREIGN PATENT DOCUMENTS

JP 63-257497 A 10/1988
JP 5-184182 A 7/1993
(Continued)

OTHER PUBLICATIONS

International Search Report issued in corresponding application PCT/JP2010/053202, completed May 17, 2010 and mailed Jun. 1, 2010.
(Continued)

*Primary Examiner* — Shawki S Ismail
*Assistant Examiner* — Jorge L Carrasquillo
(74) *Attorney, Agent, or Firm* — Griffin & Szipl, P.C.

(57) ABSTRACT

A power-saving driving device is provided for a same load pattern device 23 that is driven by a motor 21 receiving electric power from an inverter 19 and repeatedly operated in a same load pattern. The power-saving driving device includes: an electric power amount calculator 81 that calculates an electric power amount W received by the inverter in the same load pattern; and a parameter selection and command device 83 that makes a parameter of the inverter change to a plurality of values, compares the received electric power amounts corresponding to the values of the parameter, selects the parameter value minimizing the received electric power amount and issues the selected value as a command to the inverter.

15 Claims, 20 Drawing Sheets

(56) References Cited

U.S. PATENT DOCUMENTS

| | | | | |
|---|---|---|---|---|
| 5,686,807 | A | * | 11/1997 | Kusano et al. .............. 318/808 |
| 5,834,910 | A | * | 11/1998 | Tsurumi et al. .............. 318/139 |
| 7,504,796 | B2 | | 3/2009 | Ichihara |
| 2002/0117989 | A1 | * | 8/2002 | Kawabata et al. ........... 318/700 |
| 2003/0067278 | A1 | | 4/2003 | Nakamura et al. |
| 2004/0228151 | A1 | * | 11/2004 | Matsushiro et al. ........... 363/37 |
| 2007/0205742 | A1 | | 9/2007 | Ichihara |
| 2008/0180056 | A1 | * | 7/2008 | Maeda et al. ................ 318/729 |
| 2010/0237809 | A1 | * | 9/2010 | Ogahara ................ 318/400.13 |

FOREIGN PATENT DOCUMENTS

| | | |
|---|---|---|
| JP | 2003-116280 A | 4/2003 |
| JP | 2004-104934 A | 4/2004 |
| JP | 2004104934 A * | 4/2004 |
| JP | 2007-043783 A | 2/2007 |
| JP | 2009-033920 A | 2/2009 |

OTHER PUBLICATIONS

Edited by The Institute of Electrical Engineers of Japan, Semiconductor Power Converter Investigating research Committees, "Power Electronics Circuits", published by Ohmsha, Japan, 2000.

Koichi, Ohkubo et al. "Development of the Inverter to Decrease Loss for Electric Vehicle (EV) Motor", Mitsubishi Heavy Industries, Ltd. Technical Review vol. 45 No. 3, 2008.

Office Action issued in corresponding Japanese application 2009-072523 on Sep. 6, 2013.

* cited by examiner

FIG. 10A
```
                motor rotational angle command value
       time            |    section number
        T0 ——— X0  ╲ 2
        T1 ——— X1  ╱ 1
        T2 ——— X2  ╲ 1
        T3 ——— X3  ╱ 3
        T4 ——— X4  ╲ 3
        T5 ——— X5  ╱ 1
        T6 ——— X6  ╲ 2
        T7 ——— X7  ╱
```
FIG. 10B
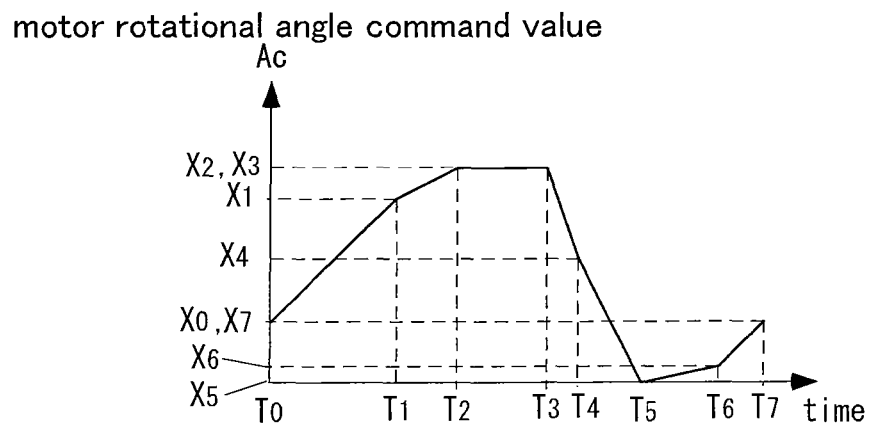
FIG. 10C
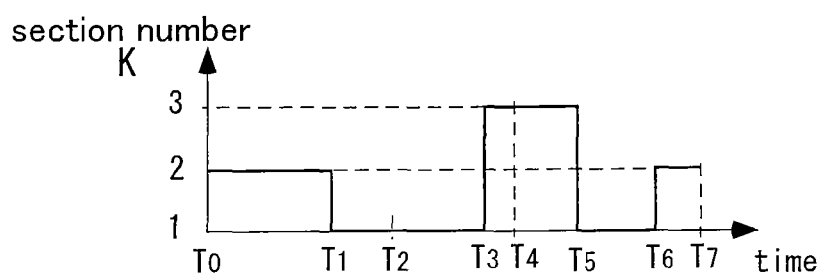

DEVICE AND METHOD FOR POWER-SAVING DRIVING OF DEVICE HAVING SAME LOAD PATTERN

This is a National Phase Application in the United States of International Patent Application No. PCT/JP2010/053202 filed Mar. 1, 2010, which claims priority on Japanese Patent Application No. 2009/072523, filed Mar. 24, 2009, and on Japanese Patent Application No. 2009/182434, filed on Aug. 5, 2009. The entire disclosures of the above patent applications are hereby incorporated by reference.

TECHNICAL FIELD

The present invention relates to a device and a method for power-saving driving of a device having a same load pattern.

BACKGROUND ART

The present invention is directed to a device driven by a motor receiving electricity from an inverter and repeatedly operated in a same load pattern. Hereinafter, such a device is called a "same load pattern device".

Herein, same load pattern devices include, but are not limited to, industrial devices such as a servo press, a die cushion for a press, a transfer device and a material handling device.

The amount of loss in the above-described same load pattern device varies with parameters of a power conversion circuit such as a carrier wave frequency and a voltage change rate dv/dt of a switching waveform.

The "amount of loss" herein means the difference between the electric power the inverter receives and the mechanical power the motor outputs, i.e., the amount of work lost as heat generation and electromagnetic radiation in the electric circuit (including the inverter and the motor) ranging from the inverter to the motor and in the magnetic circuit inside the motor.

As means for reducing this amount of loss, Patent Document 1 has been already proposed, for example. As techniques relating to the present invention, Patent Document 2 and Non-Patent Documents 1 and 2 have been disclosed.

Patent Document 1 discloses a technique of, when an operating condition of a device is changed, reducing the amount of loss by changing a parameter of electric power conversion (a carrier wave frequency of a DC/DC converter).

Non-Patent Document 2 discloses a technique of reducing the loss by selecting a different switching frequency during operation in accordance with the operating speed categorization into low-speed level, medium-speed level and high-speed level.

PRIOR ART DOCUMENTS

Patent Document

[Patent Document 1]
Japanese Patent Publication No. 2003-116280, "drive device and motive power output equipment"
[Patent Document 2]
Japanese Patent Publication No. H05-184182, "inverter controller"

Non-Patent Document

[Non-Patent Document 1]
Edited by The Institute of Electrical Engineers of Japan, Semiconductor Power Converter Investigating research Committees, "Power Electronics Circuits", published by Ohmsha, Japan, 2000

[Non-Patent Document 2]
Ohkubo Koichi, et al. "Development of the Inverter to Decrease Loss for Electric Vehicle (EV) Motor", Mitsubishi Heavy Industries, Ltd. Technical Review Vol. 45 No. 3, 2008

SUMMARY OF THE INVENTION

Problem to be Solved by the Invention

Patent Document 1 proposes means for finding a carrier wave (called carrier) frequency, that is expected to reduce the amount of loss, by (A) using loss characteristics of energy storage means, of a switching device and of coils in respective phases of a motor, or by (B) an experiment performed in advance.

However, the attempt to apply the means of Patent Document 1 to various devices, especially to industrial devices such as a servo press, a die cushion for a press, a transfer device and a material handling device will cause the following problems.

As a problem for (A), it does "not consider loss characteristics of other constituting elements".

For instance, the loss in a wiring between an inverter and a motor, in a device for electromagnetic noise removal (a ferrite core and a filter), or the loss in a rotor of a motor (such as the loss due to current inducted into the rotor) is not considered.

In the case of industrial devices, a longer wiring may be used between an inverter and a motor, a large-scale device for electromagnetic noise removal and a large motor may be used, and therefore the amount of loss from these constituting elements often cannot be ignored.

As a problem for (B), it is "difficult to find data (comprehensive loss characteristics) to decide a carrier wave frequency in advance".

This is because, for example:
(a) since wiring is performed using the wires prepared in the field, electric characteristics of the wiring cannot be estimated in advance;
(b) a device for electromagnetic noise removal may be added after the installation of the device;
(c) a motor is often replaced because of trouble, and each motor has different characteristics; and
(d) since the temperature of a motor is low immediately after the starting of the device and rises as the device is operated continuously, the loss characteristics of the motor changes with the temperature.

Further, in the conventional methods, in the case where one cycle of a load pattern includes a plurality of operations having different operating conditions (typically, a rotational speed or a torque of a motor), the effect of reducing the amount of loss cannot be achieved sufficiently.

For instance, in the case of a servo press and a die cushion for a press, one cycle includes a period where press form is performed while bringing a die into contact with a workpiece and a period where a die is moved away from the workpiece for loading and unloading of the workpiece. During the period of the press form, the device operates at a low speed but requires a large torque, whereas during the period of moving the die, the device operates with a small torque but requires a high speed. In such a case, different parameters of the inverter for respective periods may serve to the capability of selecting parameters that can further reduce the amount of loss as compared with the conventional methods.

The present invention has been created to cope with the above-stated problems. That is, it is an objective of the present invention to provide a power-saving driving device and a power-saving method for an device having a same load pattern capable of minimizing the amount of loss with consideration given to loss characteristics of all constituting elements and without preliminary experiments to acquire data on loss characteristics of a wiring, of the presence or not of a device for electromagnetic noise removal, of a temperature change of each motor and the like.

Means for Solving the Problem

According to the present invention, a power-saving driving device for a device that is driven by a motor receiving electric power from an inverter and has a same load pattern is provided. The power-saving driving device includes: an electric power amount calculator that calculates an electric power amount received by the inverter in the same load pattern; and a parameter selection and command device that makes a parameter or parameters of the inverter change to a plurality of values, compares the received electric power amounts corresponding to the values of the parameter or parameters, selects the parameter value minimizing the received electric power amount and issues the selected value as a command to the inverter.

A preferred embodiment of the present invention further includes a command value generator that outputs a cycle start signal and a cycle end signal of the load pattern.

The parameter or parameters of the inverter may be either or both of a carrier wave frequency and a voltage change rate of a switching waveform.

According to the present invention, a method for power-saving driving of a device that is driven by a motor receiving electric power from an inverter and has a same load pattern is provided. The method includes the steps of: making a parameter or parameters of the inverter change to a plurality of values; calculating electric power amounts received by the inverter in the same load pattern corresponding to the values of the parameter or parameters; and comparing the received electric power amounts corresponding to the values of the parameter or parameters, selecting the parameter value minimizing the received electric power amount, and issuing the selected value as a command to the inverter.

According to the present invention, a power-saving driving device for a device that is driven by a motor receiving electric power from an inverter and has a same load pattern is provided. The power-saving driving device includes: an electric power amount calculator that calculates an electric power amount received by the inverter for each of a plurality of sections in the same load pattern; and a parameter selection and command device that makes a parameter or parameters of the inverter change to a plurality of values, compares the received electric power amounts corresponding to the values of the parameter or parameters, selects the parameter value minimizing the received electric power amount and issues the selected value as a command to the inverter.

According to a preferred embodiment of the present invention, the power-saving driving device further includes a command value generator that outputs a cycle start signal and a cycle end signal of the load pattern, and a section number indicating each section in the load pattern.

The parameter or parameters of the inverter may be either of both of a carrier wave frequency and a voltage change rate of a switching waveform.

According to the present invention, a method for power-saving driving of a device that is driven by a motor receiving electric power from an inverter and has a same load pattern is provided. The method includes the steps of: making a parameter or parameters of the inverter change to a plurality of values; calculating electric power amounts received by the inverter for each of a plurality of sections in the same load pattern corresponding to the values of the parameter or parameters; and comparing the received electric power amounts corresponding to the values of the parameter or parameters, selecting the parameter value minimizing the received electric power amount and issuing the selected value as a command to the inverter.

According to a preferred embodiment of the present invention, the plurality of sections is set so that each section has a different speed, acceleration or torque of the motor in the load pattern.

Advantage of the Invention

According to the above-stated devices and methods of the present invention, the device includes an electric power amount calculator and a parameter selection and command device. A parameter or parameters of the inverter is changed to a plurality of values, the amount of electric power received by the inverter in a same load pattern is calculated for each parameter value for comparison or the amount of electric power received by the inverter for each of a plurality of sections in a same load pattern is calculated for each parameter value for comparison, a parameter value minimizing the amount of electric power received is selected, and the selected value is issued to the inverter as a command. As a result, the amount of loss can be minimized with consideration given to loss characteristics of all constituting elements and without preliminary experiments to acquire data on loss characteristics of a wiring, of the presence or not of a device for electromagnetic noise removal, of a temperature change of each motor and the like.

BRIEF DESCRIPTION OF DRAWINGS

FIG. 10A illustrates a relationship between time and motor rotational angle command value/section number in the form of a table.

FIG. 10B is a graph showing a relationship between time and motor rotational angle command value.

FIG. 10C is a graph showing a relationship between time and a section number.

PREFERRED EMBODIMENTS OF THE INVENTION

Figure 1:
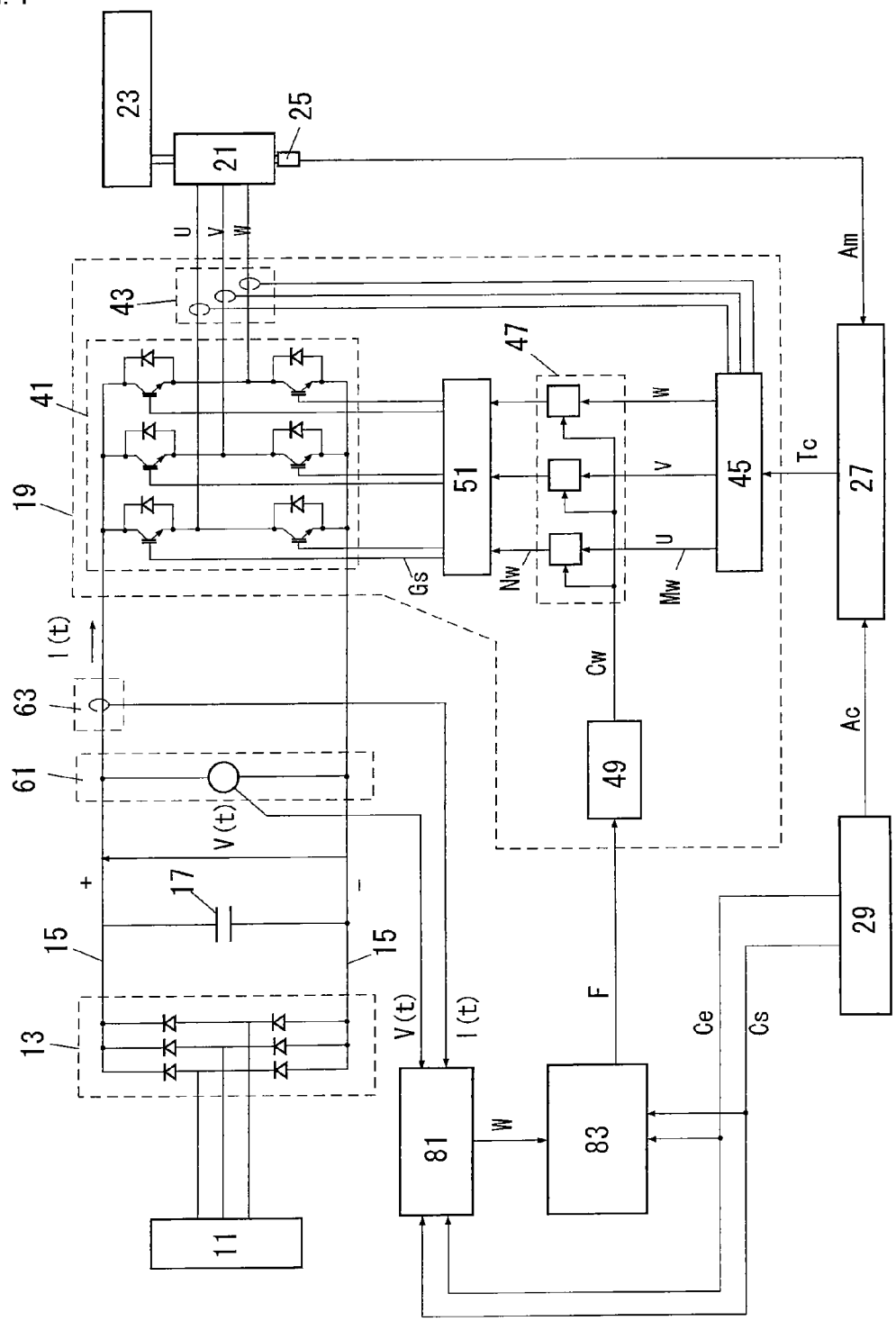
FIG. 1 illustrates a power-saving driving device of Embodiment 1 according to the present invention.

The following describes preferred embodiments of the present invention with reference to the attached drawings. In the drawings, same reference numerals will be assigned to common parts and duplicated description therefor will be omitted.

Embodiment 1

FIG. 1 illustrates a power-saving driving device of Embodiment 1 according to the present invention.

In this drawing, reference numeral 11 denotes an external power source that is a power source supplied from an electric power company or a self-power generation device. The external power source 11 assumed in the present embodiment supplies three-phase AC, though a power source in another form such as supplying single-phase AC may be used.

Reference numeral 13 denotes a converter, which converts electric power supplied from the external power source 11 into DC and feeds a DC bus 15. The converter 13 assumed in the present embodiment is a diode bridge, though other types of bridges may be used; for example, a thyristor bridge of variable voltage output by phase control or a regenerating bridge using power control devices such as power MOSFETs and IGBTs.

Reference numeral 15 denotes a DC bus for electrical connection between the converter 13 and an inverter 19. In the drawing, the positive (+) side of the DC bus 15 is illustrated above and its negative (−) side is illustrated below.

Reference numeral 17 denotes a capacitor, which smoothes voltage across the DC bus 15. As the capacitor 17, an aluminum electrolytic capacitor is often used, though other types of capacitors or an electric double layer capacitor may be used.

Reference numeral 19 denotes an inverter, which controls current/voltage flowing from the DC bus 15 to a motor 21 so that the motor 21 can generate a desired torque. The inverter 19 assumed in the present embodiment is a voltage-type inverter, though a current-type inverter may be used. In the case of a current-type inverter, a reactor will be used instead of the capacitor 17.

Further the inverter 19 assumed in the present embodiment is a four-quadrant drive inverter enabling forward and reverse rotation, power running and regeneration of the motor 21, though an inverter capable of rotation in only one direction or an inverter capable only of power running may be used depending on the characteristics or the operation of a mechanical load 23 (same load pattern device).

Reference numeral 21 denotes a motor, and the combination of the inverter 19 and the motor 21 enables the motor 21 to generate a torque in accordance with a torque command value input from a controller 27.

The motor 21 assumed in the present embodiment is a three-phase induction motor or a three-phase permanent magnet synchronous motor, though other types of motors may be used if a torque/rotational speed is variable based on the combination with an inverter.

Reference numeral 23 denotes a mechanical load, i.e., a same load pattern device, which is driven by the motor 21.

Reference numeral 25 denotes a motor encoder, which measures a rotational position (angle) of the motor 21. As the motor encoder 25, an optical or a magnetic rotary encoder or a resolver may be used. When the controller 27 controls speed, the rotational speed (angular speed) of the motor 21 will be measured. One method to measure rotational speed is to temporally differentiate the rotational position measured with the rotary encoder or the resolver. Another method may be to directly measure rotational speed with a tachometer.

Reference numeral 27 denotes a controller, where the inverter 19, the motor 21, the motor encoder 25 and the controller 27 make up a feedback loop, and control is performed so that the motor 21 follows a command value from a command value generator 29.

The controller 27 assumed in the present embodiment controls position, though the current invention may be applied if it controls speed. As a calculation method in the controller, Proportional Integral Derivative (PID) control or Integral Proportional Derivative (I-PD) control is often used, though other control methods may be used. Feedforward calculation may be combined therewith to improve controllability. The controller 27 can be implemented with a programmable device using a Digital Signal Processor (DSP) or a microcomputer, or an analogue circuit or a combination thereof.

Reference numeral 29 denotes a command value generator, which outputs to the controller 27 a motor rotational angle command value Ac to be followed by the motor 21, the command value varying against time. The motor rotational angle command value Ac may be transmitted by a two-phase pulse sequence with a 90° phase shift or by various communication networks. Since the rotational angle of the motor 21 and the mechanical load 23 are mechanically linked with each other, issuing of a command on the rotational angle of the motor 21 is synonymous with issuing of a command on the position of the mechanical load 23.

Figure 2:
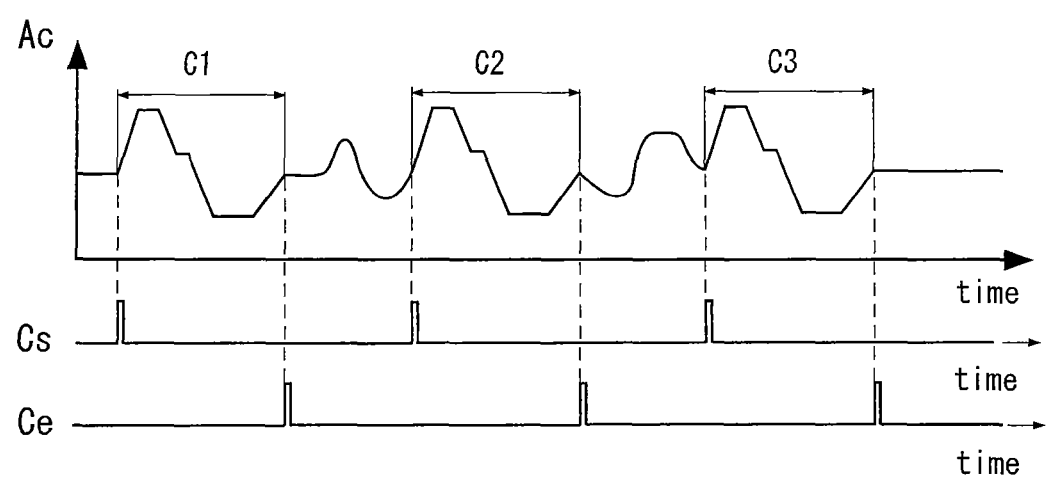
FIG. 2 explains an operation of a same load pattern device as a target for Embodiment 1.

FIG. 2 explains an operation of a same load pattern device assumed in the Embodiment 1.

Since the present invention is intended for an device repeatedly operated in a same load pattern (same load pattern device), in the present embodiment as illustrated in FIG. 2, the motor rotational angle command value Ac has a cycle (repeated same pattern), and the command value generator 29 outputs a cycle start signal Cs and a cycle end signal Ce at a starting time and an ending time of a cycle, respectively. In FIG. 2, C1, C2 and C3 each represents a cycle. Although any command value may be output between cycles, e.g., a command value to stop the mechanical load 23 or a command value to make the mechanical load 23 operate in accordance with a manual operation, such command values do not relate to the operation of the present invention. Therefore, in the following description, for the sake of simplification, we always assume that a command value to stop the mechanical load 23 is output between the cycles. In FIG. 2, the cycle start signal Cs and the cycle end signal Ce are pulse signals. They, however, may have other signal waveforms, e.g., the cycle start may be indicated with a rising edge of a signal and the cycle end may be indicated with a falling edge of a signal.

When the controller 27 controls a speed, the command value generator 29 shall output a motor rotational speed command value.

The command value generator 29 can be implemented with a programmable device using a DSP or a microcomputer provided with a memory device such as a semiconductor memory.

The inverter 19 is made up of the elements described below, and performs Pulse Width Modulation (PWM modulation) using a carrier wave Cw at a frequency in accordance with a carrier wave frequency command value F output from a parameter selection and command device 83.

The details of the configuration and the exemplary operation of the inverter are described in Non-Patent Document 1, for example. An exemplary method for PWM modulation using a variable carrier wave frequency is described in Patent Document 2. In Patent Document 2, carrier waves are called carrier.

Reference numeral 41 denotes a power controller, which controls voltage/current from the DC bus 15 to the motor 21 using a power control device whose conduction state is changed with a gate signal. The power controller 41 assumed in the present embodiment uses a self-turning-off power control device, where current can be turned off by removing a gate signal, such as a power Metal-Oxide-Semiconductor Field-Effect Transistor (power MOSFET) or an Insulated Gate Bipolar Transistor (IGBT), though other types of power control devices such as Gate Turn Off (GTO) may be used for this purpose in combination with an appropriate gate drive circuit depending on the power control device used.

Reference numeral 43 denotes a motor current measuring device, which measures current in each of UVW phases from the power controller 41 to the motor 21. The motor current measuring device 43 includes a non-contact type device that measures magnetic field generated around a wire as electrical current flows or a device including a resistor inserted in the circuit so as to measure voltage difference generated across the resistor as electrical current flows, for example. A current measuring device 63 may be implemented in a similar manner.

Reference numeral 45 denotes a command calculator, which outputs a modulation wave Mw for each phase of UVW to a PWM modulator 47 so that the motor 21 generates a torque in accordance with a torque command value Tc from the controller 27. As the command calculator 45, a device configured to generate a modulation wave for each phase by comparing a current command for each phase calculated by vector control with a measurement value by the motor current measuring device 43 is used, though other devices also may be used. The command calculator 45 can be implemented with a programmable device using a DSP or a microcomputer, or an electronic circuit or a combination thereof. By using a method of state estimation or the like in control theory, the number of components required in the motor current measuring device 43 can be reduced.

Reference numeral 47 denotes a PWM modulator, which modulates a modulation wave Mw with a carrier wave Cw and outputs a notch wave Nw that decides whether the power control device should be in conduction state or not. The PWM modulator 47 assumed in the present embodiment is means using a triangular carrier wave and deciding ON/OFF of a notch wave Nw by comparison of the magnitude between the modulation wave Mw and the carrier wave Cw. The PWM modulator 47 can be implemented with an analog electronic circuit (comparator) or with a program running on a DSP or on a microcomputer.

Reference numeral 49 denotes a carrier wave oscillator, which generates a carrier wave Cw for PWM modulation. The carrier wave oscillator 49 is configured to make an oscillation frequency variable in accordance with a carrier wave frequency command value F.

The carrier wave oscillator 49 may be implemented as an updown counter repeating count updown between two values of M1 and M2, where the values of M1 and M2 will be changed appropriately in accordance with a carrier wave frequency command value F. The updown counter may be realized either by an electronic circuit or by a program running on a DSP or on a microcomputer. The carrier wave oscillator 49 may be implemented by another method such as using an oscillation circuit based on an analogue electronic circuit.

Reference numeral 51 denotes a gate drive circuit, which performs insulation, level conversion or amplification of a notch wave Nw and outputs a gate signal to drive a gate of a power control device. The gate drive circuit 51 can be implemented with an electronic circuit using an insulated power source, a photocoupler and the like.

Reference numeral 61 denotes a voltage measuring device and 63 denotes a current measuring device. The voltage measuring device 61 and the current measuring device 63 measure voltage and current, respectively, to calculate an amount of electric power W flowing from the DC bus 15 (including the capacitor 17) to the inverter 19, and outputs a voltage measurement value V(t) and a current measurement value I(t) to an electric power amount calculator 81. The voltage measurement value V(t) and the current measurement value I(t) are transmitted by means of analogue transmission in the form of voltage amplitude and current amplitude or by means of digital transmission using various communication networks.

Voltage on the positive side with respect to the negative side of the DC bus 15 at a time t measured by the voltage measuring device 61 is denoted as V(t). Current flowing from left to right in the drawing on the positive side of the DC bus at a time t measured by the current measuring device 63 is denoted as I(t). A negative current measurement value indicates that current flows from right to left in the drawing.

Reference numeral 81 denotes an electric power amount calculator, which calculates an electric power amount W in one cycle. That is, the electric power amount calculator 81 performs temporal integration of a value obtained by multiplying the voltage measurement value V(t) and the current measurement value I(t) from a time when the cycle start signal Cs is input to a time when the cycle end signal Ce is input, and outputs the resultant. The electric power amount W in one cycle can be transmitted by means of analogue transmission in the form of voltage amplitude and current amplitude or by means of digital transmission using various communication networks.

The electric power amount calculator 81 can be implemented with a programmable device using a DSP or a microcomputer, or an analogue electronic circuit or a combination thereof.

The electric power amount calculator 81 calculates as follows.

Electric power P(t) at a time t is the product of voltage and current, which can be given by Expression (1). Herein, a positive value of P(t) indicates that electric power flows from left to right in the drawing, and a negative value of P(t) indicates that electric power flows from right to left in the drawing.

$$P(t)=V(t)\times I(t) \qquad (1).$$

Since the electric power amount W in one cycle is obtained by temporal integration of electric power, the electric power amount W in one cycle can be given by Expression (2) in Numerical Expression 1, where T1 is a time for a cycle start signal and T2 is a time for a cycle end signal for the cycle.

[Numerical Expression 1]

$$W = \int_{T1}^{T2} P(t)\,dt \qquad (2)$$

Assuming that the calculation in the electric power amount calculator 81 is performed at a time interval ☐T, the electric power amount W in one cycle is obtained by finitely differentiating Expression (2) and performing summation of V(t)× I(t)×ΔT from time T1 to time T2. That is, the electric power amount in one cycle for the cycle can be output at the cycle end time.

As described above, negative values also are permitted as the current measurement value and the electric power, whereby the present invention is applicable to the case of the mixture of power running and regeneration in one cycle as well. That is, positive and negative values of electric power correspond to power running and regeneration, respectively.

Reference numeral 83 denotes a parameter selection and command device, which issues as a command a parameter value influencing the amount of loss, while selecting an appropriate parameter value on the basis of the electric power amount for one cycle in each cycle. In the present embodiment, the parameter is frequency of carrier wave Cw, and the parameter selection and command device 83 outputs a carrier wave frequency command value F to the carrier wave oscillator 49. The parameter selection and command device 83 can be implemented with a programmable device using a DSP or a microcomputer.

Figure 3:
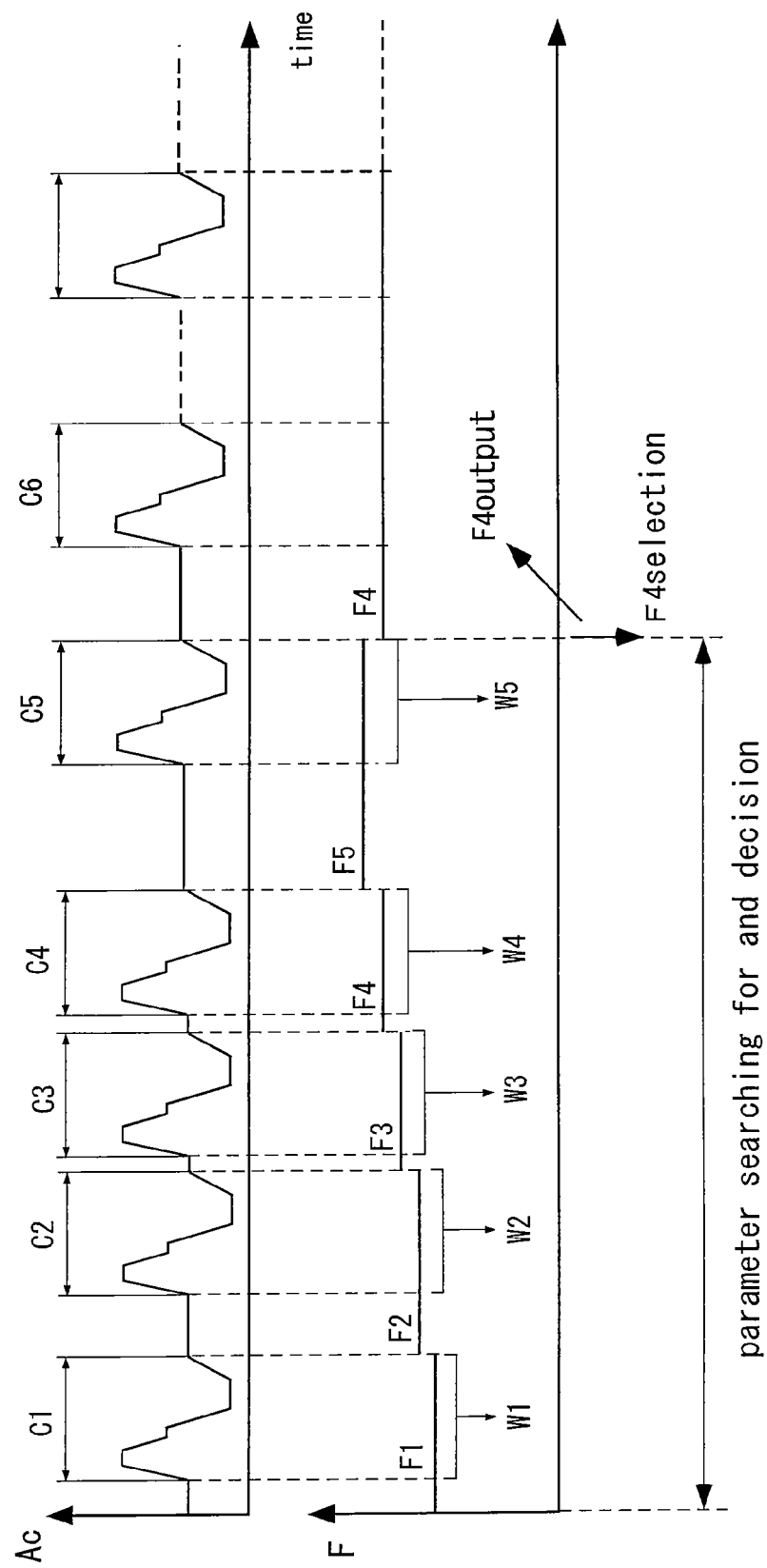
FIG. 3 explains an operation by a parameter selection and command device 83 in Embodiment 1.

FIG. 3 explains an operation of the parameter selection and command device 83.

The parameter selection and command device 83 searches for and decides a parameter to reduce the loss as follows.

The parameter selection and command device 83 outputs a different carrier wave frequency command value F for each cycle. As the electric power amount calculator 81 outputs an electric power amount W in one cycle for each cycle at the time of the cycle end, the parameter selection and command device 83 stores the electric power amount W therein. The parameter selection and command device 83 compares the stored electric power amounts W in one cycle and outputs a carrier wave frequency command value F minimizing the electric power amount as the carrier wave frequency command value F to be used subsequently.

For instance, as illustrated in FIG. 3, when the carrier wave frequency command value F is changed as F1, F2, F3, F4 and F5 for each of five cycles (in the drawing, C1, C2, C3, C4 and C5), let that the electric power amounts in one cycle are W1, W2, W3, W4 and W5 for the respective cycles. W1, W2, W3, W4 and W5 are stored and when cycle 5 (in the drawing, C5) ends, comparison is made. If W4 is the smallest, it can be understood that the carrier wave frequency command value F4 corresponding to W4 is the carrier wave frequency command value minimizing the loss. Thus, subsequently the parameter selection and command device 83 continues to output F4 as the carrier wave frequency command value.

In the example of FIG. 3, the carrier wave frequency command value F is changed in five ways including F1 to F5, and five cycles of C1 to C5 are required for searching for and deciding of a parameter (carrier wave frequency command value). However, the number of the carrier wave frequency command values F being changed is not limited to five, and may be the number Q of 2 or greater. In this case, Q cycles will be required for searching for and deciding a parameter (carrier wave frequency command value). The same applies to the examples of FIG. 4 and FIG. 5.

As for the timing when a parameter is searched for and decided, the following (1) to (3) will be possible, for example.

(1) A parameter may be searched for and decided immediately after a change of hardware that influences the loss, such as addition of a noise filter to wiring between an inverter and a motor, replacement of a motor, alteration of a mechanical load and the like. For instance, a push button (not illustrated) may be connected to the parameter selection and command device 83, and a human operator may push the push button when hardware alteration is made. After the push button is pushed, the parameter selection and command device searches for and decides a parameter (carrier wave frequency command value in this example) in the firstly conducted cycles (the first five cycles in this example), and subsequently continues to output the decided carrier wave frequency command value.

(2) A parameter may be searched for and decided again when a predetermined number of cycles or a predetermined time has elapsed after the starting of device operation. For instance, a counter counting the number of occurrence of the cycle start signal or the cycle end signal, or a timer measuring the elapsed time is provided in the parameter selection and command device, and when the value of the counter or the value of the timer reaches a predetermined value, a parameter is searched for and decided again. At the same time, the counter or the timer is reset to restart counting of the cycle number or measurement of elapsed time.

Figure 4:
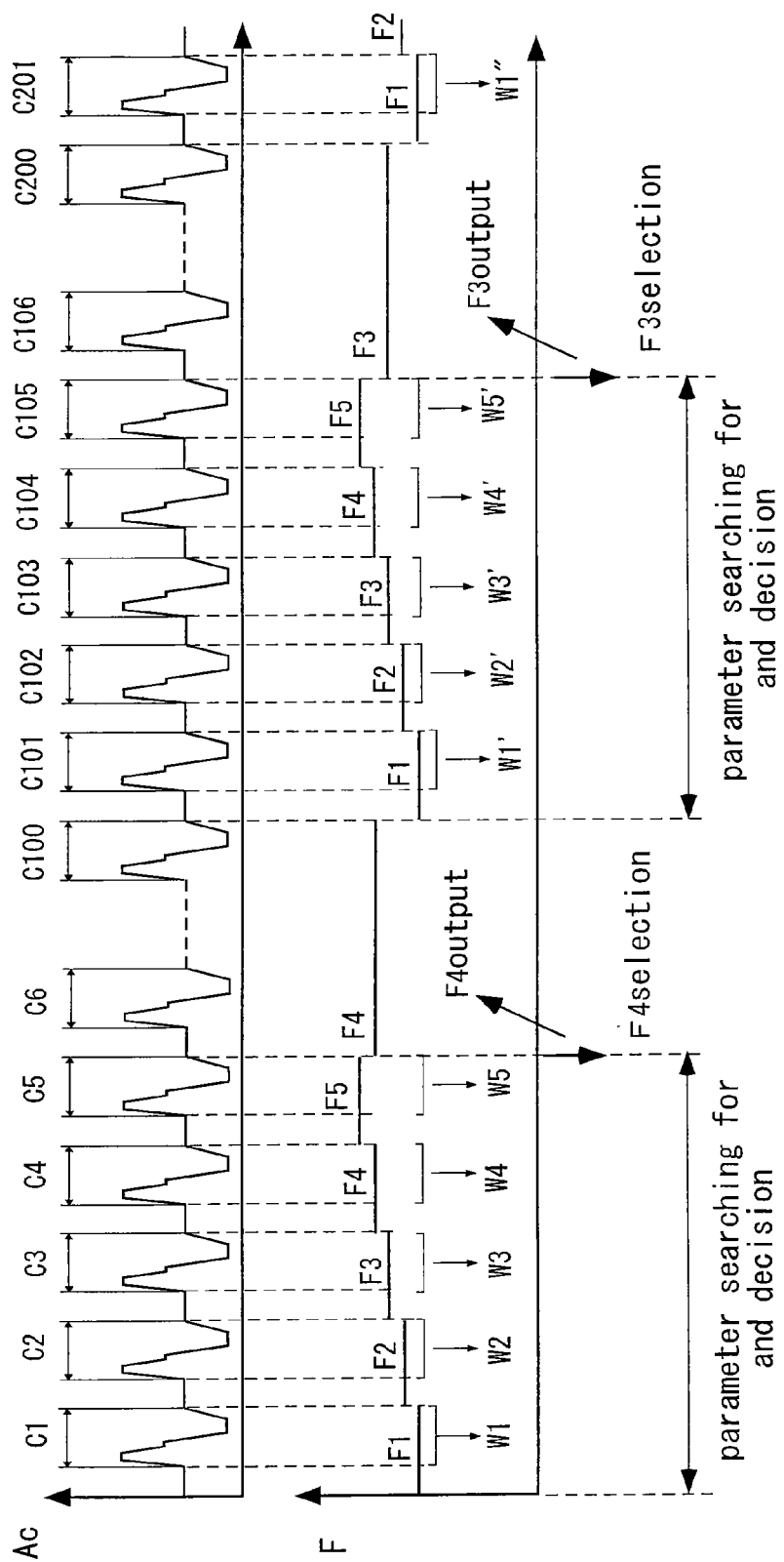
FIG. 4 illustrates an example where a parameter is searched for and decided repetitively every 100 cycles.

FIG. 4 illustrates an example where a parameter is searched for and decided repetitively every 100 cycles.

In this example, the carrier wave frequency command value F is changed as illustrated in FIG. 4. When the carrier wave frequency command value F is changed as F1, F2, F3, F4 and F5 for each of the first five cycles (in the drawing, C1, C2, C3, C4 and C5), let that the electric power amounts in one cycle are W1, W2, W3, W4 and W5 for the respective cycles. W1, W2, W3, W4 and W5 are stored and when cycle 5 (in the drawing, C5) ends, comparison is made. If W4 is the smallest, it can be understood that the carrier wave frequency command value F4 corresponding to W4 is the carrier wave frequency command value minimizing the loss. Thus, subsequently the parameter selection and command device 83 continues to output F4 as the carrier wave frequency command value until 100 cycles have elapsed (i.e., for cycles C6 to C100).

After 100 cycles have elapsed, when the carrier wave frequency command value F is changed again as F1, F2, F3, F4 and F5 for each of five cycles (in the drawing, C101, C102, C103, C104 and C105), let that the electric power amounts in one cycle are W2', W3', W4' and W5' for the respective cycles. W1', W2', W3', W4' and W5' are stored and when cycle 105 (in the drawing, C105) ends, comparison is made. If W3' is the smallest, it can be understood that the carrier wave frequency command value F3 corresponding to W3' is the carrier wave frequency command value minimizing the loss. Thus, subsequently the parameter selection and command device 83 continues to output F3 as the carrier wave frequency command value until another 100 cycles have elapsed (i.e., for cycles C106 to C200).

Subsequently, the above operation is repeated every 100 cycles. Note here that FIG. 4 illustrates the first 201 cycles (in the drawing C1 to C201).

As the device is continuously operated, temperatures rise in electric components (a motor, an inverter, wiring, a filter and the like) and in mechanical components (a bearing and the like), and therefore a relationship between the parameter and the loss may change. Even in such a case, the device can be always operated with a parameter value minimizing the loss.

Figure 5:
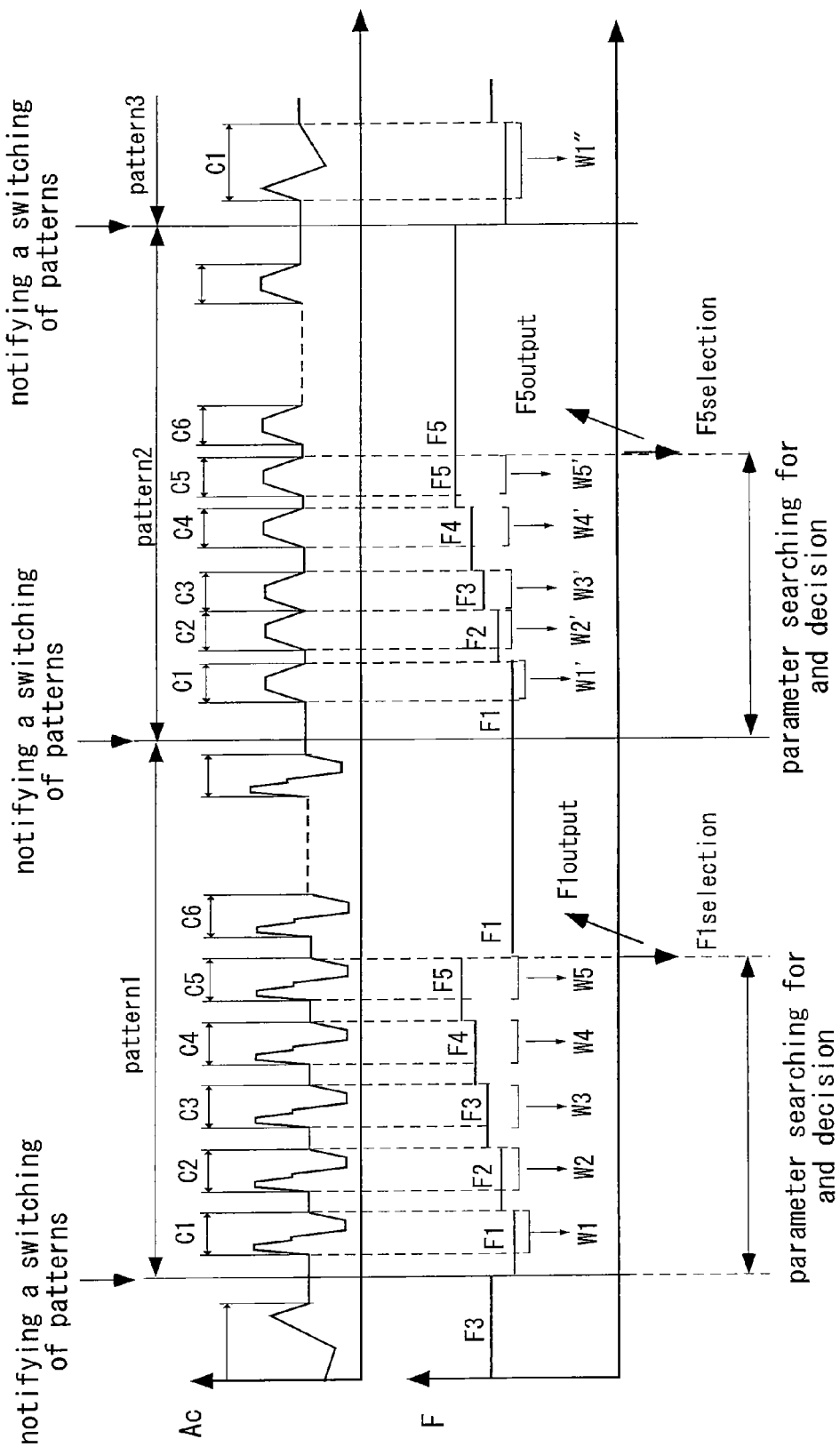
FIG. 5 illustrates the example where a parameter is searched for and decided repetitively in a device having a plurality of operating patterns.

FIG. 5 illustrates the example where a parameter is searched for and decided repetitively in a device having a plurality of operating patterns.

The carrier wave frequency command value F is changed as F1, F2, F3, F4 and F5 for each of the first five cycles operated in pattern 1 (in the drawing, C1, C2, C3, C4 and C5), and let that the electric power amounts in one cycle are W1, W2, W3, W4 and W5 for the respective cycles. W1, W2, W3, W4 and W5 are stored and when cycle 5 (in the drawing, C5) ends, comparison is made. If W1 is the smallest, it can be understood that the carrier wave frequency command value F1 corresponding to W1 is the carrier wave frequency command value minimizing the loss for pattern 1. Thus, subsequently the parameter selection and command device 83 continues to output F1 as the carrier wave frequency command value during the operation in pattern 1.

When the operating pattern changes to pattern 2, the carrier wave frequency command value F is changed as F1, F2, F3, F4 and F5 for each of the first five cycles operated in pattern 2 (in the drawing, C1, C2, C3, C4 and C5), and let that the electric power amounts in one cycle are W1', W2', W3', W4' and W5' for the respective cycles. W1', W2', W3', W4' and W5' are stored and when cycle 5 (in the drawing, C5) ends, comparison is made. If W5' is the smallest, it can be understood that the carrier wave frequency command value F5 corresponding to W5' is the carrier wave frequency command value minimizing the loss for pattern 2. Thus, subsequently the parameter selection and command device 83 continues to output F5 as the carrier wave frequency command value during the operation in pattern 2.

(3) When the present invention is applied to an device having a plurality of operating patterns (e.g., in a servo press with a plurality of dies attached thereto, each die operating differently), a parameter may be searched for and decided immediately after the operating pattern is changed. For instance, a controller (not illustrated) instructing the switching of operating patterns is configured to notify the switching of operating patterns to the parameter selection and command device, and when the parameter selection and command device is notified of the switching of operating patterns, a parameter may be searched for and decided.

Timing to search for and decide a parameter may be in the combination of the above-stated timings. The above description is just an example, and timing to search for and decide a parameter is not limited to them.

Embodiment 2

Figure 6:
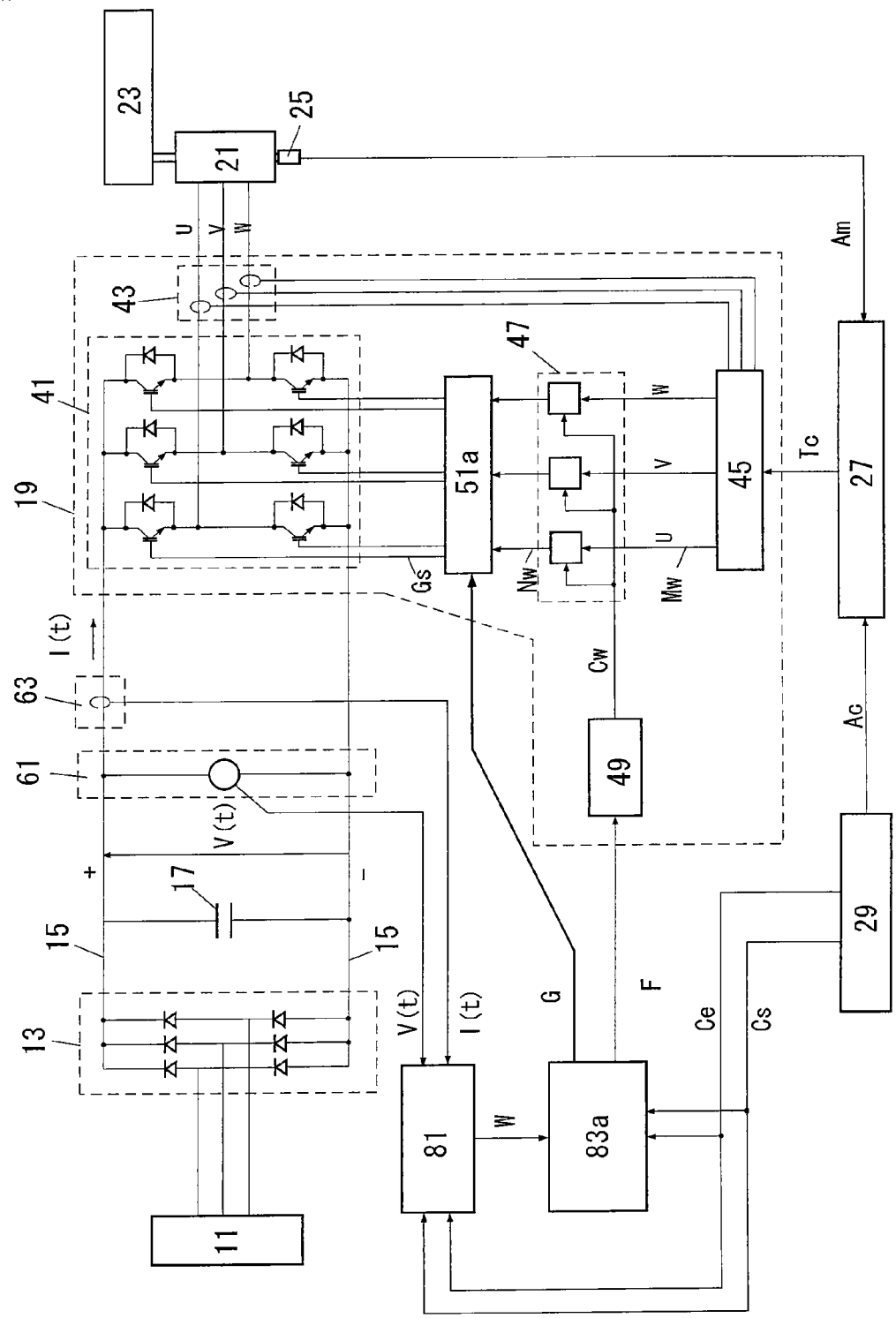
FIG. 6 illustrates a power-saving driving device of Embodiment 2 according to the present invention.

FIG. 6 illustrates a power-saving driving device of Embodiment 2 according to the present invention.

Embodiment 2 exemplifies the case of using a voltage change rate dv/dt of a switching waveform in addition to a carrier wave frequency as parameters.

The following describes only differences from Embodiment 1.

Reference numeral 51a denotes a gate drive circuit, having a soft gate drive function to control a gate voltage and a gate current in accordance with a command value G for a voltage change rate and suppress a voltage change rate dv/dt of a switching waveform to a command value G in addition to the function of the gate drive circuit 51 of Embodiment 1. An exemplary soft gate drive method is described in Non-Patent Document 1.

Reference numeral 83a denotes a parameter selection and command device, having a function to output a command value G for a voltage change rate to the gate drive circuit 51a in addition to the function of the parameter selection and command device 83 of Embodiment 1.

Similarly to Embodiment 1, electric power amounts W in one cycle are stored and compared while changing the carrier wave frequency command value F and the command value G for a voltage change rate output from the parameter selection and command device 83a, and the carrier wave frequency command value F and the command value G for a voltage change rate minimizing the electric power amount W is output as the carrier wave frequency command value F and the command value G for a voltage change rate to be used subsequently.

In this embodiment, the command value G for a voltage change rate also is changed, whereby loss can be further reduced as compared with Embodiment 1.

Figure 7:
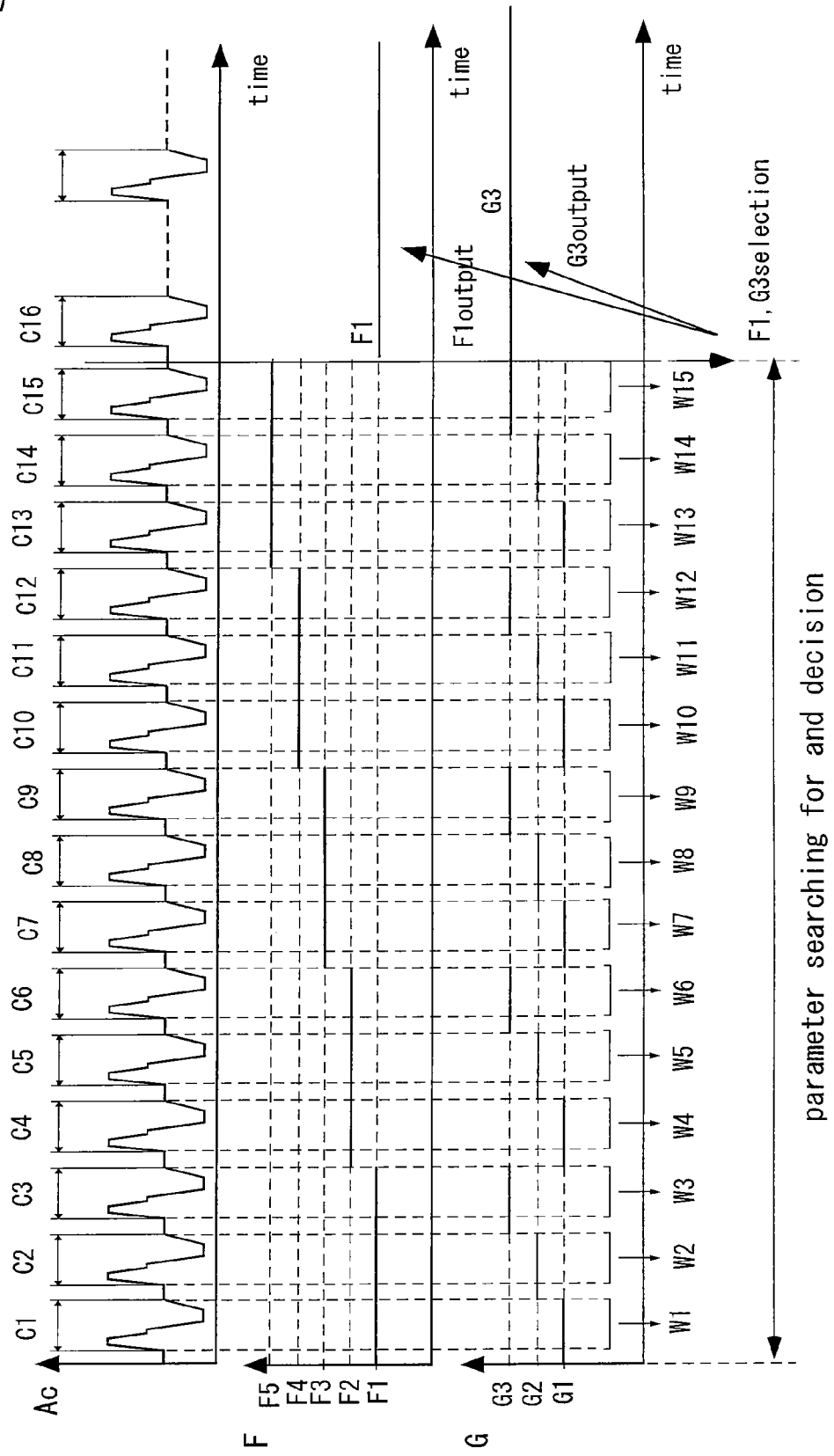
FIG. 7 explains a method for searching for and deciding a plurality of parameters in Embodiment 2.

FIG. 7 explains a method for searching for and deciding a plurality of parameters.

The following method enables, for example, to search for and decide a plurality of parameters (the carrier wave frequency command value F and the command value G for a voltage change rate) reducing the loss.

Electric power amounts in one cycle are stored and compared for all of the combinations of the carrier wave frequency command value F and the command value G for a voltage change rate. For instance, in the case where the carrier wave frequency command value F has five values of F1, F2, F3, F4 and F5, and the command value G for a voltage change rate has three values of G1, G2 and G3, electric power amounts in one cycle (in the drawing, W1 to W15) for 5×3=15 cycles as illustrated in FIG. 7 (in the drawing, C1 to C15) are stored and compared, and the carrier wave frequency command value F and the command value G for a voltage change rate are selected. FIG. 7 illustrates the case where W3 is the smallest among W1 to W15, and therefore it can be understood that the combination of the carrier wave frequency command value F1 and the command value G3 for a voltage change rate corresponding to W3 is the combination of the carrier wave frequency command value F and the command value G for a voltage change rate minimizing the loss. Thus, the parameter selection and command device 83a continues to output F1 as the carrier wave frequency command value and G3 as the command value for a voltage change rate after the end of cycle 15 (i.e., cycle C16 or later in the drawing).

In the example of FIG. 7, the carrier wave frequency command value F is changed including five values of F1 to F5, and the command value G for a voltage change rate is changed including three values of G1 to G3, and 5×3=15 cycles (in the drawing, C1 to C15) are required for searching for and deciding of parameters (carrier wave frequency command value and command value for a voltage change rate). However, the number of the carrier wave frequency command values being changed and the number of the command values for a voltage change rate being changed are not limited to 5 and 3, respectively, which may be the numbers Q and R of 2 or greater. In this case, Q□R cycles will be required for searching for and deciding parameters (a carrier wave frequency command value and a command value for a voltage change rate).

In the above-stated method, if the combinations of parameter values (in the above example, 15 combinations) become too many and the number of cycles required for searching for and deciding parameters becomes too large, combinations of parameters may be selected, instead of using all of the combinations, based on random numbers or genetic algorithm. Other methods based on theory of design of experiments may be used.

Effects from Embodiments 1 and 2

According to the device and method of Embodiment 1 or Embodiment 2 of the present invention as described above, the device includes the electric power amount calculator 81 and the parameter selection and command device 83, a parameter or parameters of the inverter 19 is changed to a plurality of values, the amount of electric power W received by the inverter in a same load pattern is calculated for each parameter value for comparison, a parameter value minimizing the amount of electric power W received is selected, and the selected value is issued to the inverter as a command. Therefore, the amount of loss can be minimized with consideration given to loss characteristics of all constituting elements and without preliminary experiments to acquire data on loss characteristics of a wiring, of the presence or not of a device for electromagnetic noise removal, of a temperature change of each motor and the like.

When industrial devices such as a servo press, a die cushion for a press, a transfer device and a material handling device are repeatedly operated in a same load pattern, an output from the motor will be the same for each cycle.

Accordingly, in the case of using a carrier wave frequency as a parameter for the inverter, for example, let that operation in one cycle is performed at the carrier wave frequency of f1 and operation in another cycle is performed at the carrier wave frequency of f2, and the measurement values obtained for the amount of electric power received by the inverter are E1 and E2, respectively, in these cycles. Since the amount of loss is a difference between the amount of electric power received by the inverter and the integrated value of motor output, if E1<E2, the amount of loss will be smaller at the carrier wave frequency of f1, and if E1>E2, the amount of loss will be smaller at the carrier wave frequency of f2.

Therefore, the amounts of electric power received by the inverter in cycles are measured while changing a parameter of the inverter (e.g., carrier wave frequency) and these amounts are compared, whereby a parameter value minimizing the amount of loss can be found. Then, when the device is operated with such a parameter, the amount of loss can be minimized.

Accordingly, the above-stated device and method of Embodiment 1 or Embodiment 2 lead to the following effects.

(1) A carrier wave frequency which will reduce loss can be found without the labor and time to acquire data on loss characteristics by preliminary experiments, and operation with reduced loss can be performed.

(2) These embodiments are applicable also to the case where a motor performs not only power running but also regeneration during the operation of the device and even to the case where the motor performs only regeneration.

(3) These embodiments may be so configured that, when outside circumference changes, e.g., a change in wiring, replacement of a motor or a temperature change, a carrier wave frequency which will reduce loss can be automatically found while continuing the operation of the device, and operation with reduced loss can be performed.

(4) A parameter other than the carrier wave frequency influencing the loss, e.g., a voltage change rate dv/dt of a switching waveform can be automatically adjusted, whereby operation with reduced loss can be performed.

Embodiment 3

Figure 8:
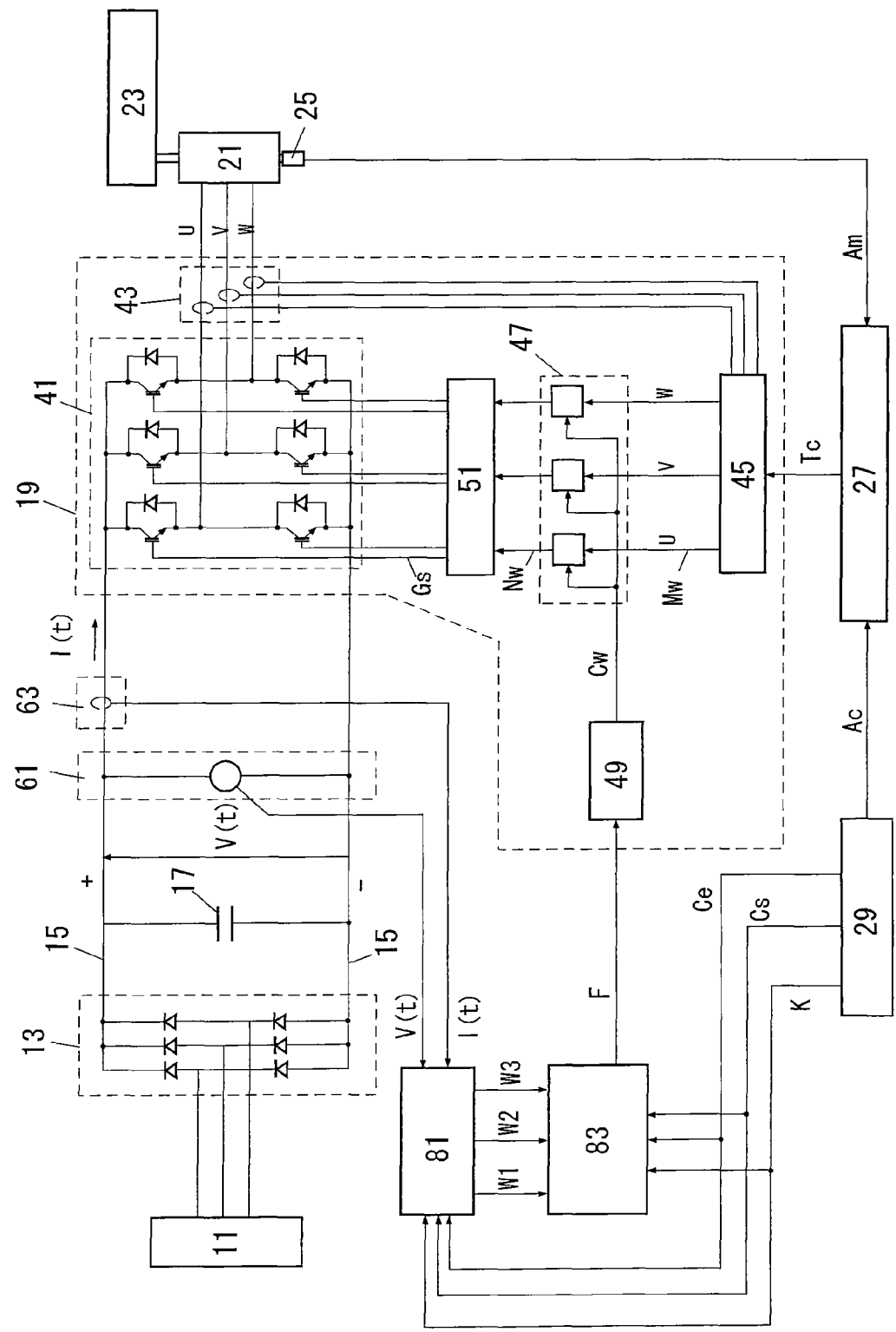
FIG. 8 illustrates a power-saving driving device of Embodiment 3 according to the present invention.

FIG. 8 illustrates a power-saving driving device of Embodiment 3 according to the present invention.

Embodiment 3 is the same as in Embodiment 1 except for the following points.

In Embodiment 3, an inverter 19 has a function to switch parameters (carrier wave frequency, voltage change rate dv/dt of a switching waveform) even within a cycle.

Figure 9:
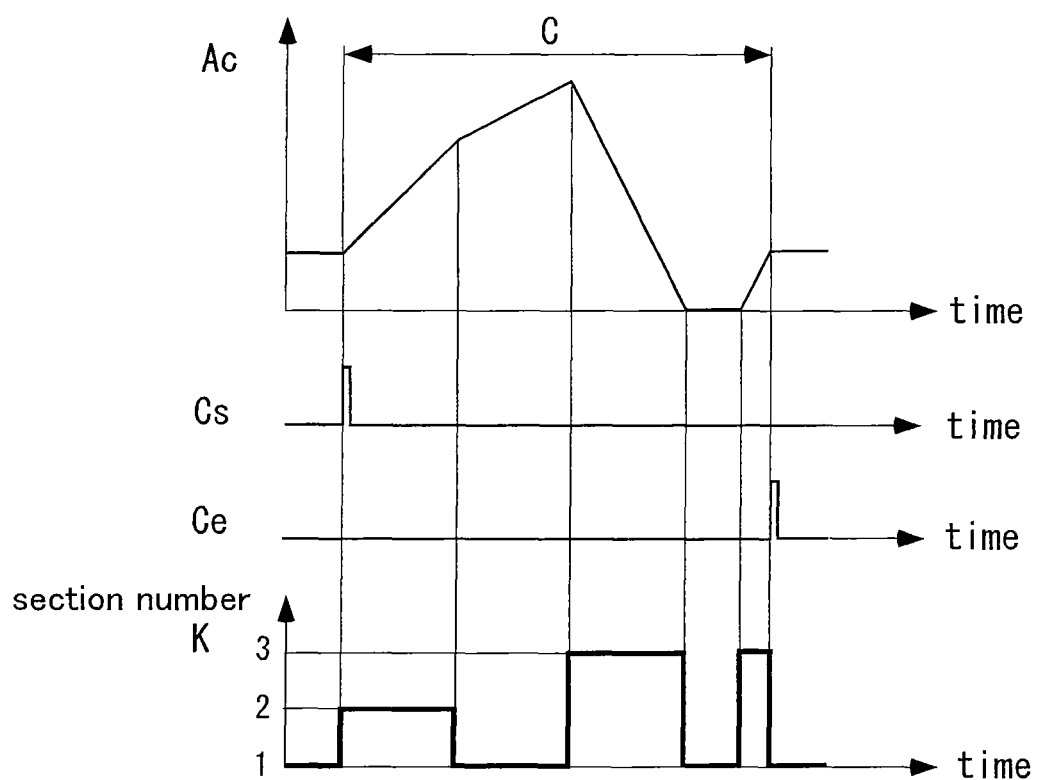
FIG. 9 explains an operation of a same load pattern device as a target for Embodiment 3.

FIG. 9 explains an operation of a same load pattern device as a target for Embodiment 3.

Since the present invention is intended for an device repeatedly operated in a same load pattern (same load pattern device), in Embodiment 3 as illustrated in FIG. 9, a motor rotational angle command value Ac has a cycle (repeated same pattern), and a command value generator 29 outputs a cycle start signal Cs and a cycle end signal Ce at a starting time and an ending time of a cycle, respectively. In FIG. 9, C represents one cycle.

In Embodiment 3, the command value generator 29 generates a section number K indicating the current section within a cycle of the load pattern, and outputs the section number K to an electric power amount calculator 81 and a parameter selection and command device 83. In this example, section numbers 1, 2 and 3 correspond to a low-speed level, a medium-speed level and a high-speed level, respectively, but other schemes for dividing a cycle into sections may be possible. It is desirable that a cycle of a load pattern will be so divided into sections that each section should have different operating conditions, i.e., speed, acceleration or torque of a motor.

Although an output from the command value generator 29 between cycles does not relate to the operation of the present invention, the following description assumes that a section number (section 1 in the example) corresponding to the lowest speed is output as a section number between cycles for the sake of simplicity with consideration given to the device being often stopped or manually operated at a low speed between cycles.

In FIG. 9, the cycle start signal Cs and the cycle end signal Ce are pulse signals. They, however, may have other signal waveforms, e.g., the cycle start may be indicated with a rising edge of a signal and the cycle end may be indicated with a falling edge of a signal.

FIGS. 10A through 10C illustrate an exemplary method to generate a motor rotational angle command value and a section number in the command value generator.

As a method to generate a motor rotational angle command value and a section number in the command value generator 29, relationships between time and motor rotational angle command value/section number are stored as a table as illustrated in FIG. 10A, the motor rotational angle command values are obtained by linear interpolation between points designated in the table as illustrated in FIG. 10B, and for the section number, a section number designated in the table is output during a time period designated in the table as illustrated in FIG. 10C.

The electric power amount calculator 81 calculates an electric power amount for each of the plurality of sections in one cycle. That is, the electric power amount calculator 81 performs temporal integration of a value obtained by multiplying a voltage measurement value V(t) and a current measurement value I(t) separately for each of the plurality of sections from a time when the cycle start signal Cs is input to a time when the cycle end signal Ce is input, and outputs the resultant.

That is, the electric power amount calculator in the present embodiment calculates electric power amounts W1, W2 and W3 for section 1, section 2 and section 3 in one cycle for each cycle. In the present embodiment, the number of sections is 3, and when the number of sections is N, electric power amounts W1, . . . WN are calculated for section 1, . . . section N.

The electric power amounts W1, W2 and W3 for section 1, section 2 and section 3 in one cycle can be transmitted by means of analogue transmission in the form of voltage amplitude and current amplitude or by means of digital transmission using various communication networks.

The electric power amount calculator 81 calculates as follows.

Electric power P(t) at a time t is the product of voltage and current, which can be represented by Expression (3). Herein, a positive value of P(t) indicates that electric power flows from left to right in the drawing, and a negative value of P(t) indicates that electric power flows from right to left in the drawing.

$$P(t)=V(t)\times I(t) \quad (3).$$

Since the electric power amount is obtained by temporal integration of electric power, the electric power amount W1 for section 1 in one cycle, the electric power amount W2 for section 2 in one cycle and the electric power amount W3 for section 3 in one cycle can be represented by Expressions (4), (5) and (6), respectively, in Numerical Expression 2, where T1 is a time of a cycle start signal and T2 is a time of a cycle end signal for the cycle. Further, A1(t), A2(t) and A3(t) are the following signals:

A1(t): 1 in section 1, 0 in other sections
A2(t): 1 in section 2, 0 in other sections
A3(t): 1 in section 3, 0 in other sections.

Figure 11A:
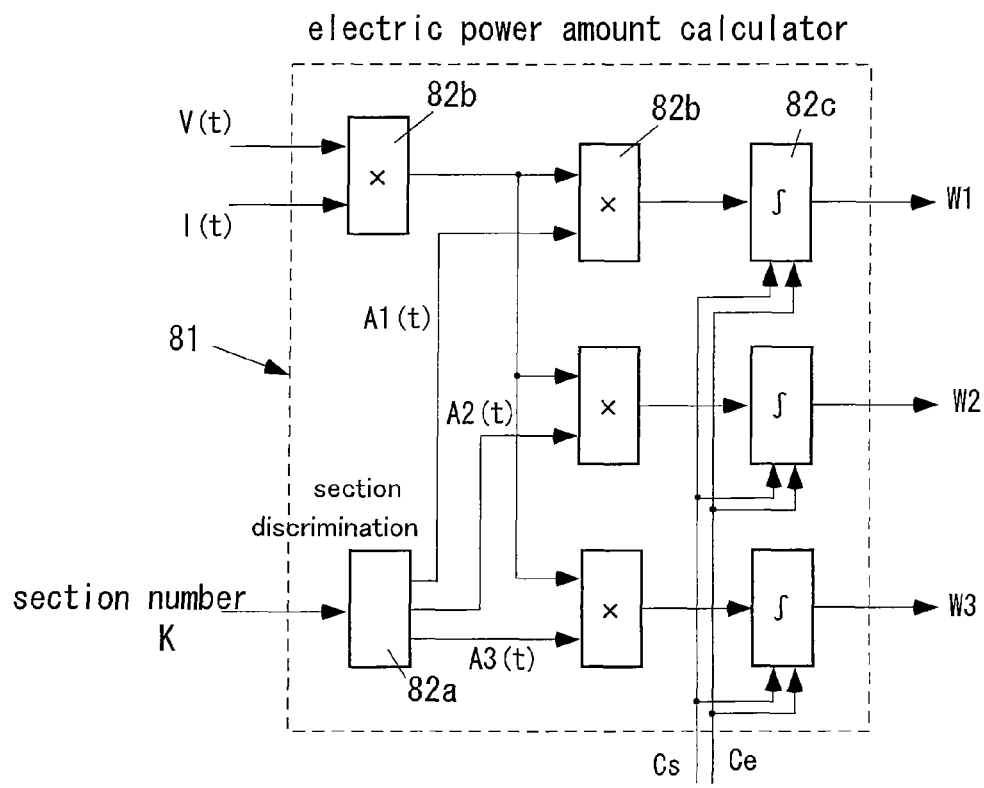
FIG. 11A schematically illustrates the internal configuration of an electric power amount calculator 81 in Embodiment 3.
Figure 11B:
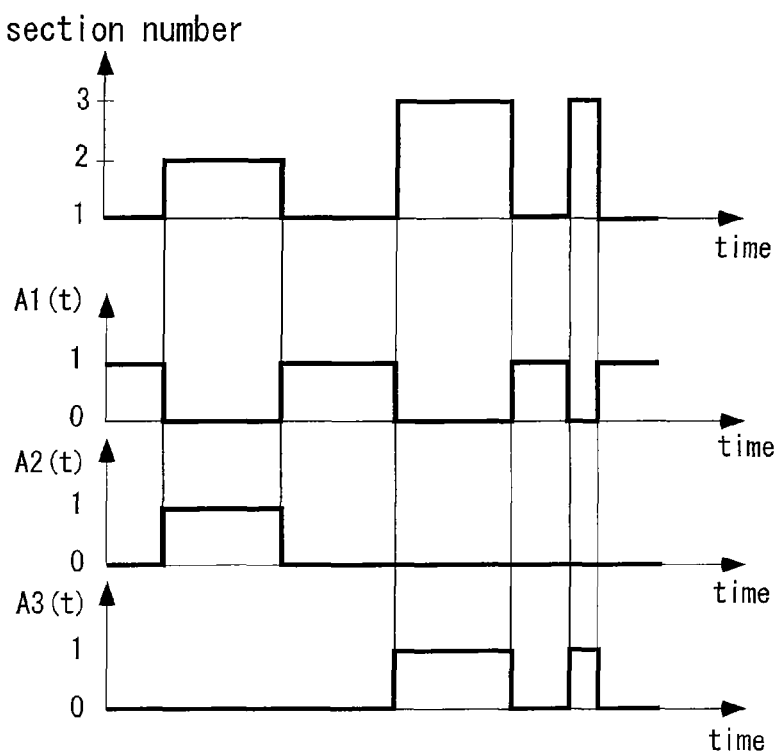
FIG. 11B is a graph showing a relationship between time, a section number and signals $A1(t)$, $A2(t)$ and $A3(t)$.

For instance, when the section number changes as illustrated in the top graph of FIG. 11B, signals A1(t), A2(t) and A3(t) will change as shown in the second, the third and the fourth graphs, respectively, え of FIG. 11B.

In the example, the number of sections is 3, and when the number of sections is N, electric power amounts for the sections are W1, . . . , WN, and signals will be A1(t), . . . AN(t).

[Numerical Expression 2]

$$W1 = \int_{T1}^{T2} A1(t) \times P(t) dt \quad (4)$$

$$W2 = \int_{T1}^{T2} A2(t) \times P(t) dt \quad (5)$$

$$W3 = \int_{T1}^{T2} A3(t) \times P(t) dt \quad (6)$$

FIG. 11A schematically illustrates the internal configuration of the electric power amount calculator 81.

In this drawing, reference numeral 82a denotes section discrimination, 82b denotes multiplication and 82c denotes integration. When the cycle start signal Cs is input, 82c starts integration, and when the cycle end signal Ce is input, 82c ends the integration.

The internal configuration of the electric power amount calculator 81 as illustrated in FIG. 11A, for example, enables the calculation of W1, W2 and W3.

Assuming that the calculation in the electric power amount calculator 81 is performed at a time interval ΔT, the electric power amounts W1, W2 and W3 for a plurality of sections in one cycle are obtained by finitely differentiating Expressions (4) through (6) and performing integration of V(t)×I(t)×ΔT independently for each of the plurality of sections from time T1 to time T2. That is, the electric power amounts for each of the plurality of sections in one cycle can be output at the cycle end time.

As described above, negative values also are permitted as the current measurement value and the electric power, whereby the present invention is applicable to the case of the mixture of power running and regeneration in one cycle as well. That is, positive and negative values of electric power correspond to power running and regeneration, respectively.

The parameter selection and command device 83 issues as a command a parameter value influencing the amount of loss, while selecting an appropriate parameter value based on the electric power amount for each of a plurality of sections for each cycle. In Embodiment 3, the parameter is frequency of carrier wave Cw, and the parameter selection and command device 83 outputs a carrier wave frequency command value F to the carrier wave oscillator 49.

Figure 12:
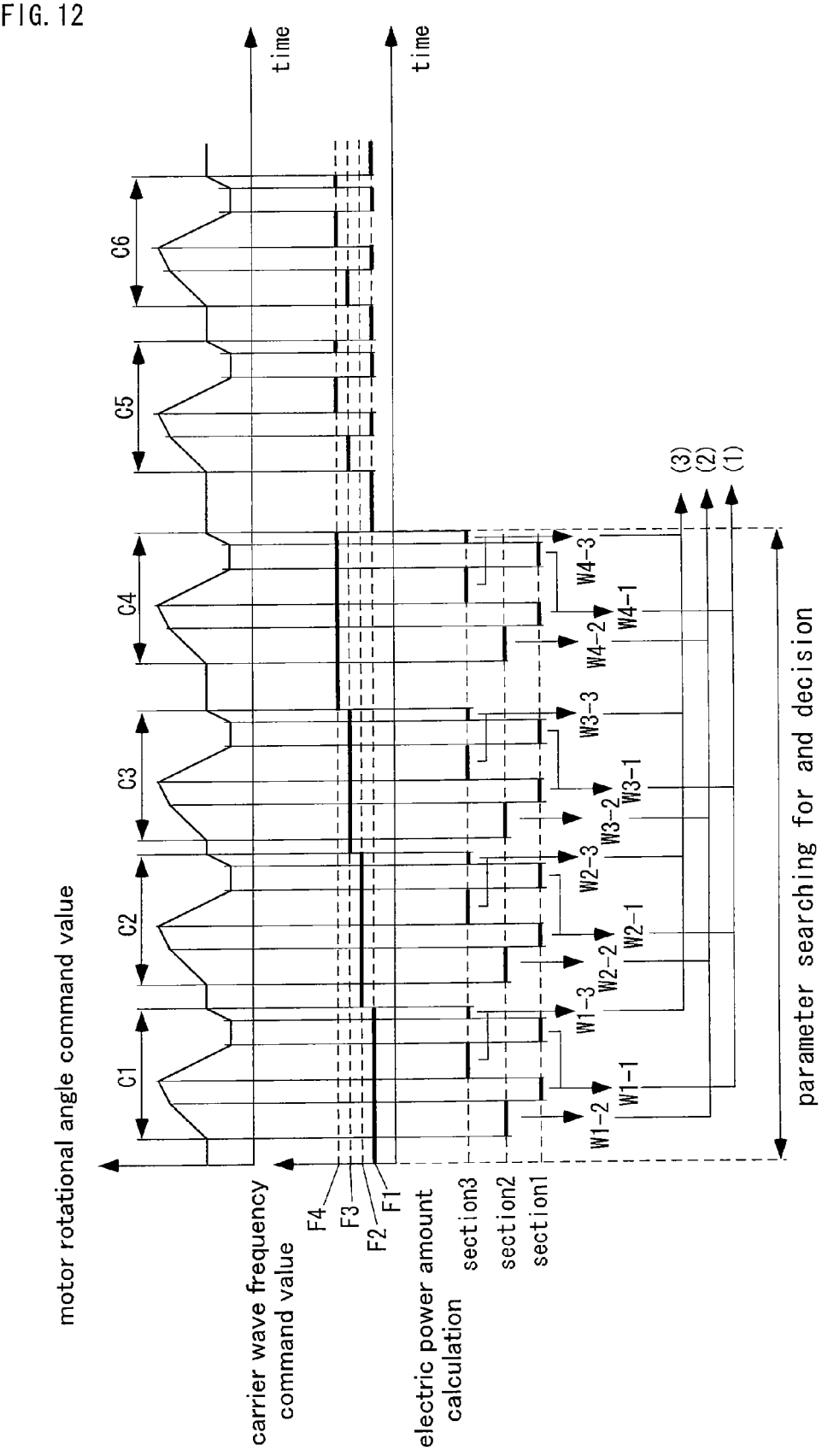
FIG. 12 explains an operation by a parameter selection and command device 83 in Embodiment 3.

FIG. 12 explains an operation by the parameter selection and command device 83 in Embodiment 3.

The parameter selection and command device 83 searches for and decides a parameter to reduce the loss as follows.

The parameter selection and command device 83 outputs a different carrier wave frequency command value F for each cycle. As the electric power amount calculator 81 outputs an electric power amount for each of a plurality of sections in each cycle at the time of cycle end, the parameter selection and command device 83 stores the electric power amounts therein. The parameter selection and command device 83 compares, based on the stored electric power amounts for each of the plurality of sections in one cycle, the electric power amounts corresponding to the same section between different cycles, and outputs a carrier wave frequency command value F minimizing the electric power amount as the carrier wave frequency command value F to be used for the section subsequently.

For instance, as illustrated in FIG. 12, when the carrier wave frequency command value F is changed as F1, F2, F3 and F4 for each of four cycles (in the drawing, C1, C2, C3 and C4), let that the electric power amounts for each of a plurality of section in one cycle are W1-1, 2, 3, W2-1, 2, 3, W3-1, 2, 3, and W4-1, 2, 3 for these cycles. W1-1, 2, 3, W2-1, 2, 3, W3-1, 2, 3, and W4-1, 2, 3 are stored and when cycle 4 (in the drawing, C4) ends, comparison is made independently for section 1, section 2 and section 3 between different cycles as illustrated in FIG. 12.

(1) Section 1 in cycle 1 (C1), section 1 in cycle 2 (C2), and section 1 in cycle 3 (C3) . . . electric power amounts of them are compared.

(2) Section 2 in cycle 1 (C1), section 2 in cycle 2 (C2), and section 2 in cycle 3 (C3) . . . electric power amounts of them are compared.

(3) Section 3 in cycle 1 (C1), section 3 in cycle 2 (C2), and section 3 in cycle 3 (C3) . . . electric power amounts of them are compared.

That is, the electric power amounts are compared as follows for selection of a parameter.

(1) As for section 1, W1-1, W2-1, W3-1 and W4-1 are compared. Letting that W1-1 is the smallest, then it can be understood that a carrier wave frequency command value F1 corresponding to W1-1 is the carrier wave frequency command value minimizing the loss for section 1. Then, in section 1, the parameter selection and command device 83 continues to output F1 as the carrier wave frequency command value.

(2) As for section 2, W1-2, W2-2, W3-2 and W4-2 are compared. Letting that W3-2 is the smallest, then it can be understood that a carrier wave frequency command value F3 corresponding to W3-2 is the carrier wave frequency command value minimizing the loss for section 2. Then, in section 2, the parameter selection and command device 83 continues to output F3 as the carrier wave frequency command value.

(3) As for section 3, W1-3, W2-3, W3-3 and W4-3 are compared. Letting that W4-3 is the smallest, then it can be understood that a carrier wave frequency command value F4 corresponding to W4-3 is the carrier wave frequency command value minimizing the loss for section 3. Then, in section 3, the parameter selection and command device 83 continues to output F4 as the carrier wave frequency command value.

In the example of FIG. 12, the carrier wave frequency command value F is changed in four ways including F1 to F4, and four cycles of C1 to C4 are required for searching for and deciding of a parameter (carrier wave frequency command value). However, the number of the carrier wave frequency command values F being changed is not limited to four, and may be the number Q of 2 or greater. In this case, Q cycles will be required for searching for and deciding a parameter (carrier wave frequency command value).

As for the timing when a parameter is searched for and decided, the following (1) to (3) will be possible, for example.

(1) A parameter may be searched for and decided immediately after a change of hardware that influences the loss, such as addition of a noise filter to wiring between an inverter and a motor, replacement of a motor, alteration of a mechanical load and the like. For instance, a push button (not illustrated) may be connected to the parameter selection and command device 83, and a human operator may push the push button when hardware alteration is made. After the push button is pushed, the parameter selection and command device searches for and decides a parameter (carrier wave frequency command value in this example) in the firstly conducted cycles (the first four cycles in this example), and subsequently continues to output the decided carrier wave frequency command values for the respective sections.

(2) A parameter may be searched for and decided again when a predetermined number of cycles or a predetermined time has elapsed after the starting of device operation. For instance, a counter counting the number of occurrence of the cycle start signal or the cycle end signal, or a timer measuring elapsed time is provided in the parameter selection and command device, and when the value of the counter or the value of the timer reaches a predetermined value, a parameter is searched for and decided again. At the same time, the counter or the timer is reset to restart counting of the cycle number or measurement of elapsed time.

As the device is continuously operated, temperatures rise in electric components (a motor, an inverter, wiring, a filter and the like) and in mechanical components (a bearing and the like), and therefore a relationship between the parameter and the loss may change. Even in such a case, the device can be always operated with a parameter value minimizing the loss.

(3) When the present invention is applied to an device having a plurality of operating patterns (e.g., in a servo press with a plurality of dies attached thereto, each die operating differently), a parameter may be searched for and decided immediately after the operating pattern is changed. For instance, a controller (not illustrated) instructing the switching of operating patterns is configured to notify the switching of operating patterns to the parameter selection and command device, and when the parameter selection and command device is notified of the switching of operating patterns, a parameter may be searched for and decided.

Timing to search for and decide a parameter may be in the combination of the above-stated timings. The above description is just an example, and timing to search for and decide a parameter is not limited to them.

Embodiment 4

Figure 13:
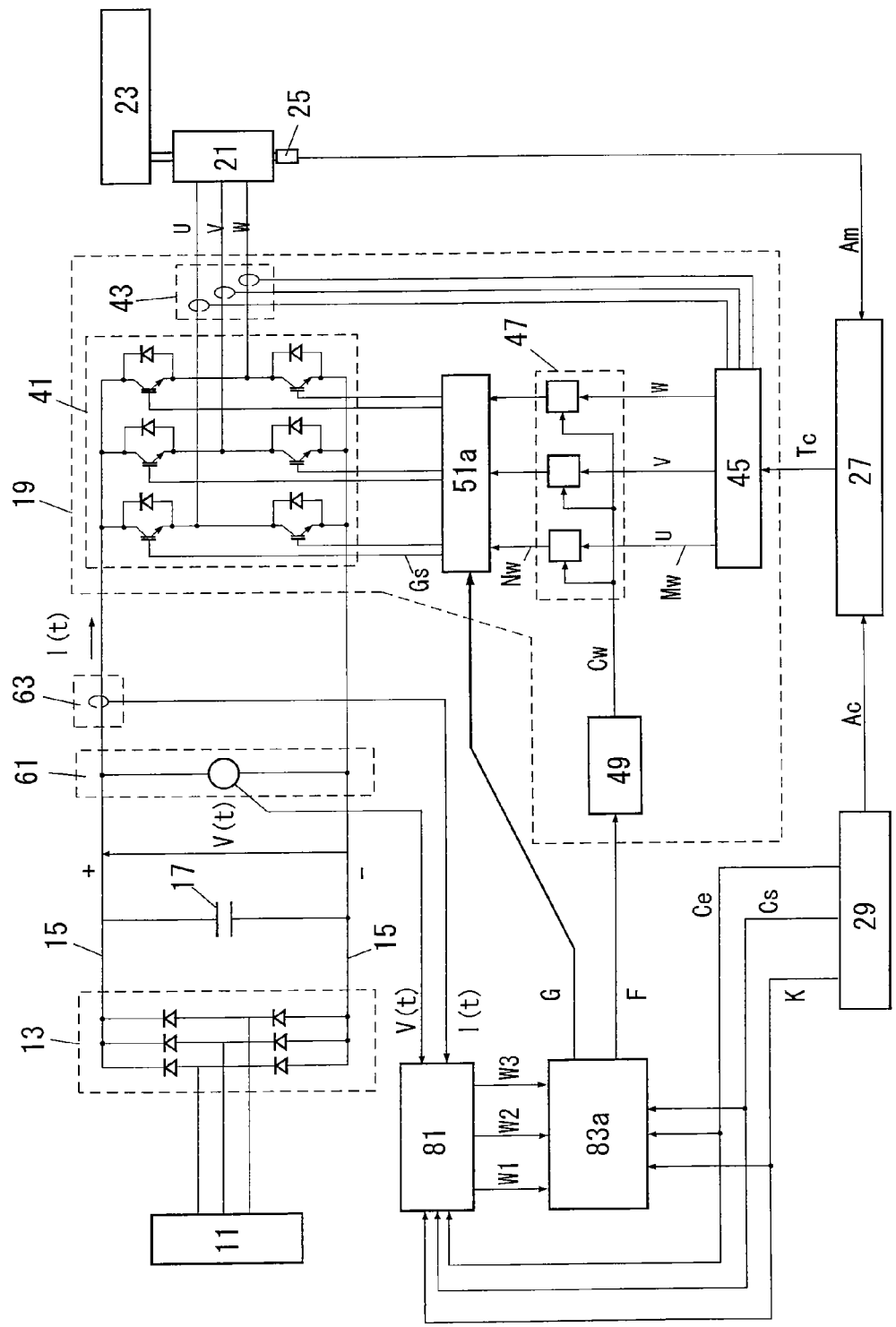
FIG. 13 illustrates a power-saving driving device of Embodiment 4 according to the present invention.

FIG. 13 illustrates a power-saving driving device of Embodiment 4 according to the present invention. Embodiment 4 is the same as in Embodiment 3 except for the following points.

Embodiment 4 exemplifies the case of using a voltage change rate dv/dt of a switching waveform in addition to a carrier wave frequency as parameters.

The following describes only differences from Embodiment 3.

Reference numeral 51a denotes a gate drive circuit, having a soft gate drive function to control a gate voltage and a gate current in accordance with a command value G for a voltage change rate and suppress a voltage change rate dv/dt of a switching waveform to a command value G, in addition to the function of the gate drive circuit 51 of Embodiment 3. An exemplary soft gate drive method is described in Non-Patent Document 1.

Reference numeral 83a denotes a parameter selection and command device, having a function to output a command value G for a voltage change rate to the gate drive circuit 51a, in addition to the function of the parameter selection and command device 83 of Embodiment 3.

Similarly to Embodiment 3, electric power amounts for each of a plurality of sections in one cycle are stored while changing the carrier wave frequency command value F and the command value G for a voltage change rate output from the parameter selection and command device 83a, and the electric power amounts for the same section are compared between different cycles, and the carrier wave frequency command value F and the command value G for a voltage change rate minimizing the electric power amount is output as the carrier wave frequency command value F and the command value G for a voltage change rate to be used for the section subsequently.

In Embodiment 4, the command value G for a voltage change rate also is changed, whereby loss can be further reduced as compared with Embodiment 3.

Figure 14:
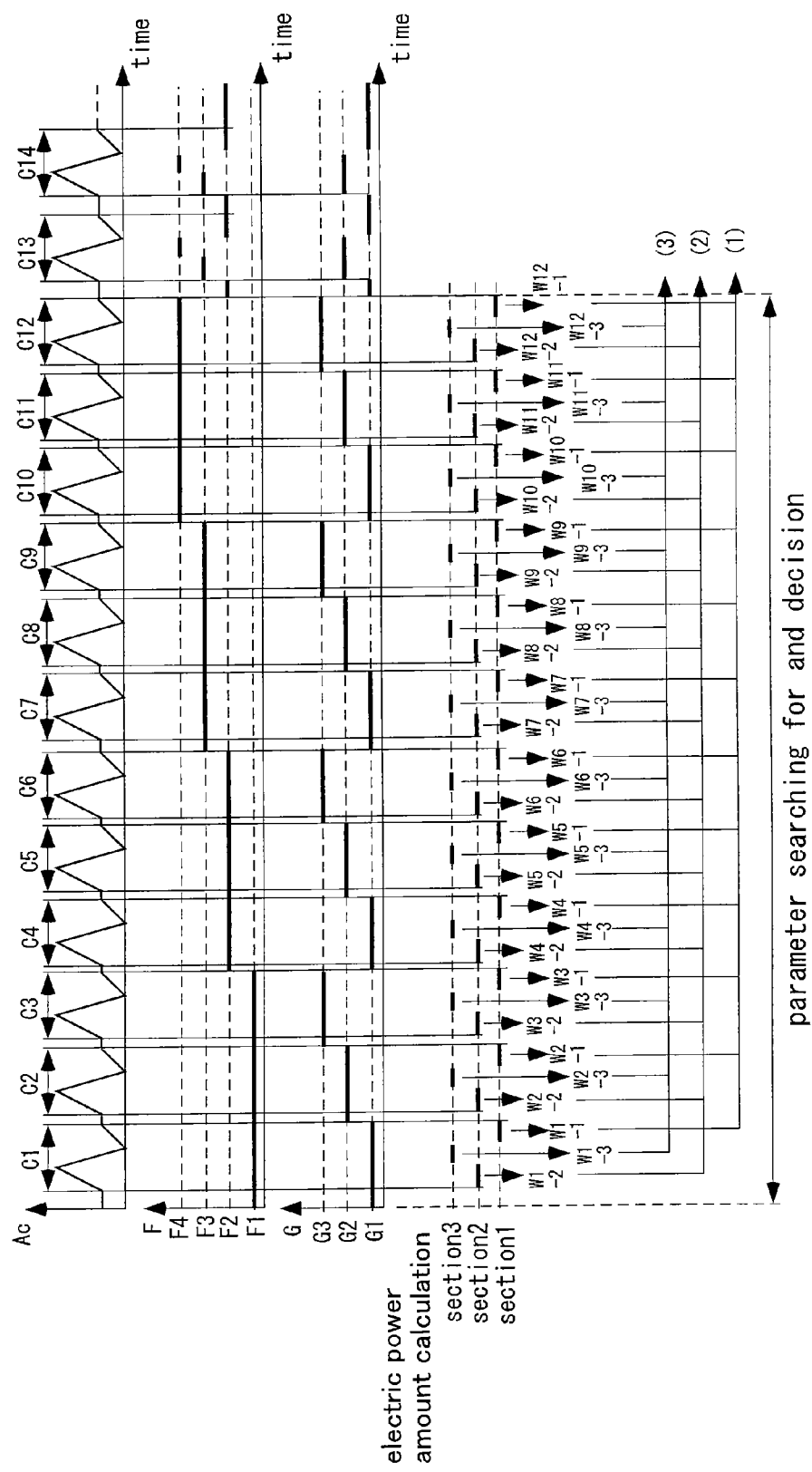
FIG. 14 explains a method for searching for and deciding a plurality of parameters in Embodiment 4.

FIG. 14 explains a method for searching for and deciding a plurality of parameters in Embodiment 4.

The following method, for example, enables to search for and decide a plurality of parameters (the carrier wave frequency command value F and the command value G for a voltage change rate) reducing the loss.

Electric power amounts for each of a plurality of sections in one cycle are stored and compared for all of the combinations of the carrier wave frequency command value F and the command value G for a voltage change rate. For instance, in the case where the carrier wave frequency command value F has four values of F1, F2, F3 and F4, and the command value G for a voltage change rate has three values of G1, G2 and G3, electric power amounts in one cycle (in the drawing, W1-1, W1-2, W1-3, . . . , W12-1, W12-2, W12-3) are stored for 4×3=12 cycles as illustrated in FIG. 14 (in the drawing, C1 to C12) and the electric power amounts independently for section 1, section 2 and section 3 are compared between different cycles, so that the carrier wave frequency command value F and the command value G for a voltage change rate are selected.

In the example of FIG. 14, (1) for section 1: W1-1 through W12-1 are compared, and the carrier wave frequency command value F2 and the voltage change rate G1 corresponding to W4-1, which is the smallest among W1-1 through W12-1, are selected, (2) for section 2: W1-2 through W12-2 are compared, and the carrier wave frequency command value F3 and the voltage change rate G2 corresponding to W8-2, which is the smallest among W1-2 through W12-2, are selected, and (3) for section 3: W1-3 through W12-3 are compared, and the carrier wave frequency command value F4 and the voltage change rate G2 corresponding to W11-3, which is the smallest among W1-3 through W12-3, are selected.

Then, after the end of cycle 12 (i.e., cycle C13 or later in the drawing), the parameter selection and command device 83a continues to output the selected carrier wave frequency command value and the selected command value for a voltage change rate for each of section 1, section 2 and section 3. That is, in section 1, the parameter selection and command device 83a outputs F2 as the carrier wave frequency command value and G1 as the voltage change rate. In section 2, the parameter selection and command device 83a outputs F3 as the carrier wave frequency command value and G2 as the voltage change rate. In section 3, the parameter selection and command device 83a outputs F4 as the carrier wave frequency command value and G2 as the voltage change rate.

In the example of FIG. 14, the carrier wave frequency command value F is changed including four values of F1 to F4, and the command value G for a voltage change rate is changed including three values of G1 to G3, and 4×3=12 cycles (in the drawing, C1 to C12) are required for searching for and deciding of parameters (carrier wave frequency command value and command value for a voltage change rate). However, the number of the carrier wave frequency command values being changed and the number of the command values for a voltage change rate being changed are not limited to 4 and 3, respectively, which may be the numbers Q and R of 2 or greater. In this case, Q×R cycles will be required for searching for and deciding parameters (a carrier wave frequency command value and a command value for a voltage change rate).

In the above-stated method, if the combinations of parameter values (in the above example, 12 combinations) become too many and the number of cycles required for searching for and deciding parameters becomes too large, combinations of parameters may be selected, instead of using all of the combinations, based on random numbers or genetic algorithm. Other methods based on theory of design of experiments may be used.

Effects from Embodiments 3 and 4

According to the device and method of Embodiment 3 or Embodiment 4 as described above, the device includes the electric power amount calculator and the parameter selection and command device, a parameter or parameters of an inverter is changed to a plurality of values, the amount of electric power received by the inverter is calculated for each of a plurality of sections in a same load pattern for each parameter for comparison, a parameter value minimizing the amount of electric power received is selected, and the selected value is issued to the inverter as a command. Therefore, the amount of loss can be minimized with consideration given to loss characteristics of all constituting elements and without preliminary experiments to acquire data on loss characteristics of a wiring, of the presence or not of a device for electromagnetic noise removal, of a temperature change of each motor and the like.

When industrial devices such as a servo press, a die cushion for a press, a transfer device and a material handling device are repeatedly operated in a same load pattern, an output from the motor will be the same for each cycle.

Accordingly, in the case of using a carrier wave frequency as a parameter for the inverter, for example, let that operation in one cycle is performed at the carrier wave frequency of f1, and operation in another cycle is performed at the carrier wave frequency of f2, and the measurement values obtained for the amount of electric power received by the inverter are E1 and E2, respectively, in these cycles. Then, since the amount of loss is a difference between the amount of electric power received by the inverter and the integrated value of motor output, if E1<E2, the amount of loss will be smaller at the carrier wave frequency of f1, and if E1>E2, the amount of loss will be smaller at the carrier wave frequency of f2.

Therefore, the amounts of electric power received by the inverter in cycles are measured while changing a parameter of the inverter (e.g., carrier wave frequency), and these amounts are compared, whereby a parameter value minimizing the amount of loss can be found. Then, when the device is operated with such a parameter, the amount of loss can be minimized.

The inverter has a function of switching parameters (carrier wave frequency, voltage change rate dv/dt of a switching waveform) even within a cycle.

According to the present invention, one cycle is divided into a plurality of sections, an electric power amount calculator calculates an amount of electric power for each of the sections, the amounts of electric power are compared for each section between a plurality of cycles each with a different parameter value, and a parameter value minimizing the electric power amount is selected, and therefore the amount of loss can be further reduced.

Accordingly, the above-stated device and method of Embodiment 3 or Embodiment 4 lead to the following effects.

(1) A carrier wave frequency which will reduce loss can be found without the labor and time to acquire data on loss characteristics by preliminary experiments, and operation with reduced loss can be performed.

(2) These embodiments are applicable also to the case where a motor performs not only power running but also regeneration during the operation of the device and even to the case where the motor performs only regeneration.

(3) These embodiments may be so configured that, when outside circumference changes, e.g., a change in wiring, replacement of a motor or a temperature change, a carrier wave frequency which will reduce loss can be automatically found while continuing the operation of the device, and operation with reduced loss can be performed.

(4) A parameter other than the carrier wave frequency influencing the loss, e.g., a voltage change rate dv/dt of a switching waveform can be automatically adjusted, whereby operation with reduced loss can be performed.

(5) A parameter value minimizing an amount of electric power is selected for each of a plurality of sections in one cycle, and therefore the amount of loss can be further reduced.

Embodiment 5 and Embodiment 6

Figure 15:
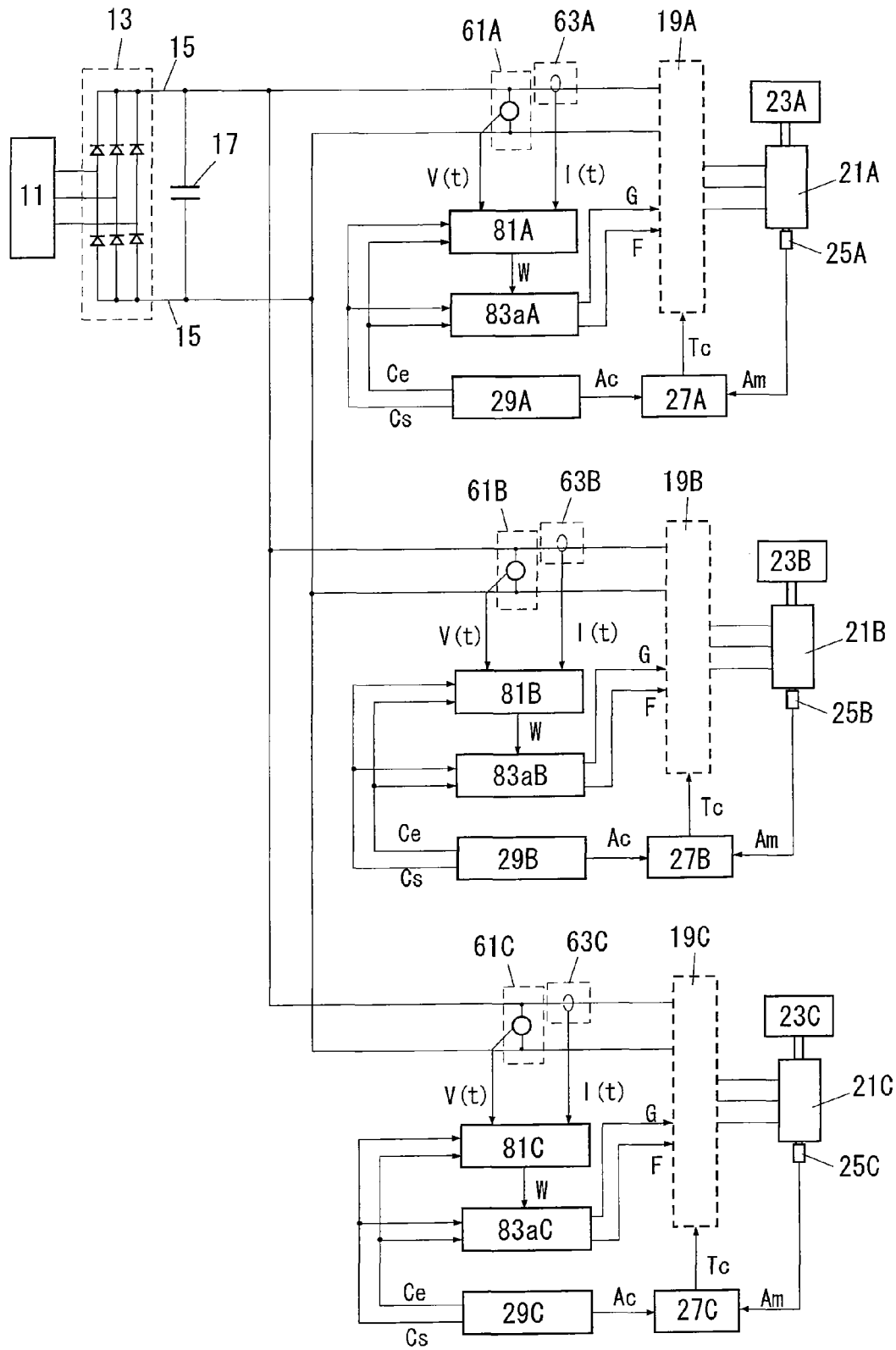
FIG. 15 illustrates a power-saving driving device of Embodiment 5 according to the present invention.

FIG. 15 illustrates a power-saving driving device of Embodiment 5 according to the present invention.

Figure 16:
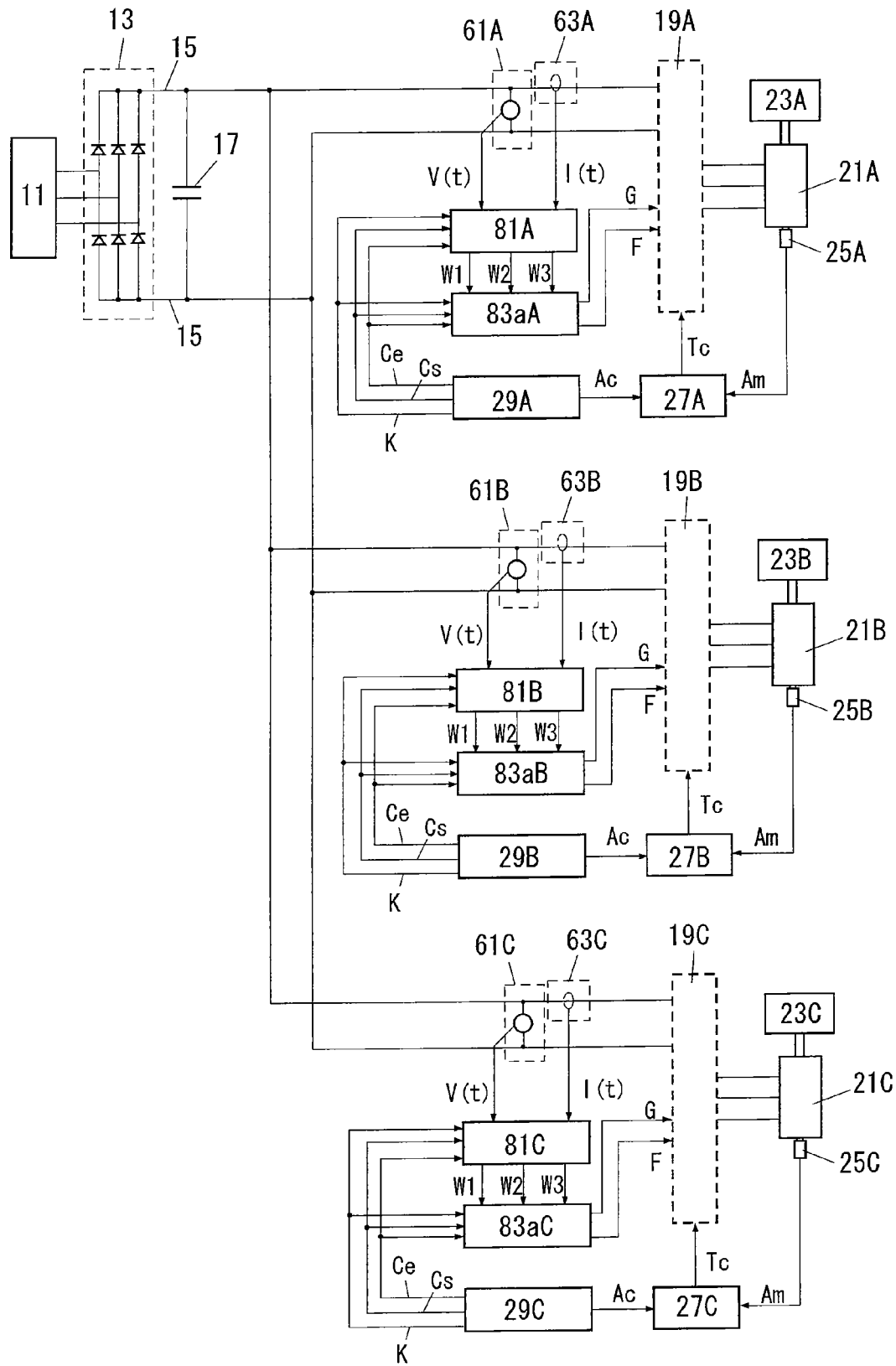
FIG. 16 illustrates a power-saving driving device of Embodiment 6 according to the present invention.

FIG. 16 illustrates a power-saving driving device of Embodiment 6 according to the present invention.

In these examples, a plurality of inverters and motors are included, each of which operates independently. For instance, a transfer device has X-axis, Y-axis, and Z-axis, and moves to any position in a three-dimensional space by following an independent path along each axis. FIG. 15 and FIG. 16 illustrate the expansion of Embodiment 2 and Embodiment 4, respectively, including a plurality of inverters and motors. When a command value G for a voltage change rate is omitted, they correspond to expansion of Embodiment 1 and Embodiment 3, respectively, including a plurality of inverters and motors. FIG. 15 and FIG. 16 illustrate the case of three inverters and motors, but the case of two inverters/motors or of four or more inverters/motors will be obtained in a similar way. In FIG. 15 and FIG. 16, as the internal configuration of the inverters 19A, 19B and 19C is the same as those in Embodiment 2 and Embodiment 4, the internal configuration of the inverter is omitted.

Each inverter and motor has the following elements, which are identified with letters A, B and C added at the end of the descriptors. The configuration of each element is the same as in Embodiment 2 and Embodiment 4.

19A, 19B, 19C inverter
21A, 21B, 21C motor
23A, 23B, 23C mechanical load
25A, 25B, 25C motor encoder
27A, 27B, 27C controller
29A, 29B, 29C command value generator
61A, 61B, 61C voltage measuring device
63A, 63B, 63C current measuring device
81A, 81B, 81C electric power amount calculator
83aA, 83aB, 83aC parameter selection and command device Since those three sets, distinguished by the letters A, B and C added at the end of the descriptors, operate completely independently, each set will operate in the same way as in Embodiment 2 or Embodiment 4, and the parameters (carrier wave frequency command value F and command value G for a voltage change rate) will be searched for and decided for each set, whereby loss in each set can be reduced.

Embodiment 7 and Embodiment 8

Figure 17:
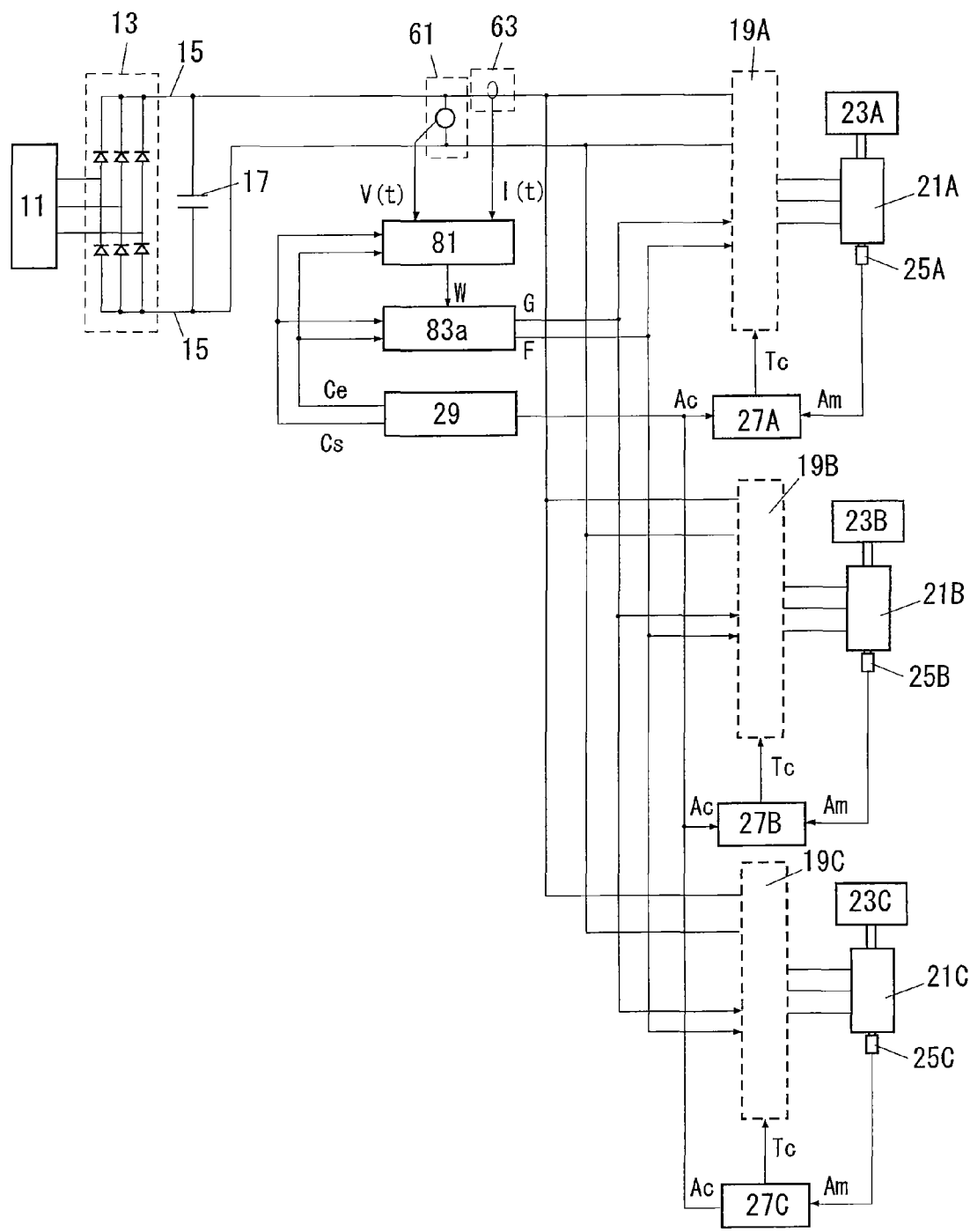
FIG. 17 illustrates a power-saving driving device of Embodiment 7 according to the present invention.

FIG. 17 illustrates a power-saving driving device of Embodiment 7 according to the present invention.

Figure 18:
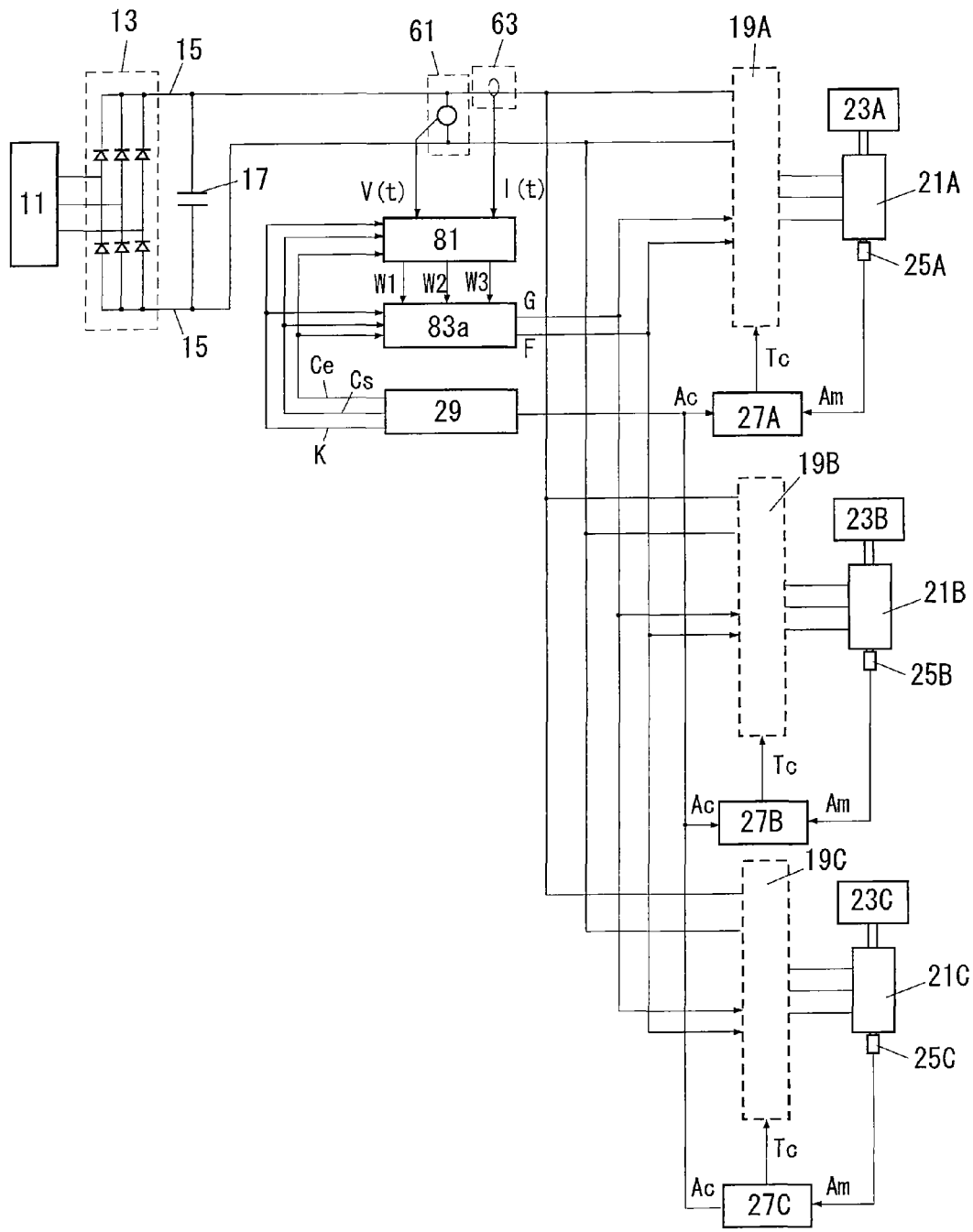
FIG. 18 illustrates a power-saving driving device of Embodiment 8 according to the present invention.

FIG. 18 illustrates a power-saving driving device of Embodiment 8 according to the present invention.

In these examples, a plurality of inverters and motors are included, each of which moves in an identical motion. For instance, there is a case where one mechanical load is shared among and driven by a plurality of motors because the size of a motor is limited.

FIG. 17 and FIG. 18 illustrate the expansion of Embodiment 2 and Embodiment 4, respectively, including a plurality of inverters and motors. When a command value G for a voltage change rate is omitted, they correspond to expansion of Embodiment 1 and Embodiment 3, respectively, including a plurality of inverters and motors. FIG. 17 and FIG. 18 illustrate the case of three inverters and motors, but the case of two inverters/motor or of four or more inverters/motor will be obtained in a similar way. In FIG. 17 and FIG. 18, as the internal configuration of the inverters is the same as those in Embodiment 2 and Embodiment 4, the internal configuration of the inverter is omitted.

Each inverter and motor has the following elements, which are identified with letters A, B and C added at the end of the descriptors. The configuration of each element is the same as in Embodiment 2 and Embodiment 4.

19A, 19B, 19C inverter
21A, 21B, 21C motor
23A, 23B, 23C mechanical load
25A, 25B, 25C motor encoder
27A, 27B, 27C controller Since those three sets, distinguished by the letters A, B and C added at the end of the descriptors, operate completely identically, only one parameter selection and command device is included, and parameters (carrier wave frequency command value F and command value G for a voltage change rate) for the three sets will be made always identical. Since the voltage/current measurement device is connected so as to measure the total amount of electric power of the three sets, the same electric power amount calculation and parameter searching/decision operation as in Embodiment 2 or Embodiment 4 will enable parameters (carrier wave frequency command value and command value G for a voltage change rate) to be searched for and decided so as to reduce the total loss for the three sets.

The present invention is not limited to the above described embodiments, and naturally may be modified variously without departing from the scope of the present invention. For instance, the following modifications are possible.

The above-described cycle of the present invention may be a time period where the device operates in identical motion, and therefore such a cycle does not have to strictly agree with an operating cycle of the device to which the present invention is applied. For instance, only a time period where the device operates rapidly and large electrical current flows through a motor may be dealt with as a cycle of the present invention.

The voltage measuring device 61 and the current measuring device 63 may be interchanged so that the current measuring device may be brought to the left side in FIG. 1, FIG. 6 and other figures, for example.

The above-described configurations illustrated in the embodiments are divided on the basis of their functions, and the physical configuration may be different. For instance, not only the command calculator but also the electric power amount calculator and the parameter selection and command device may be implemented with a programmable device using a digital signal processor (DSP) or a microcomputer inside the inverter. One of or both of the voltage measuring device and the current measuring device (only for Embodiments 1, 2, 3, 4, 5 and 6) may be configured inside the inverter.

Figure 19:
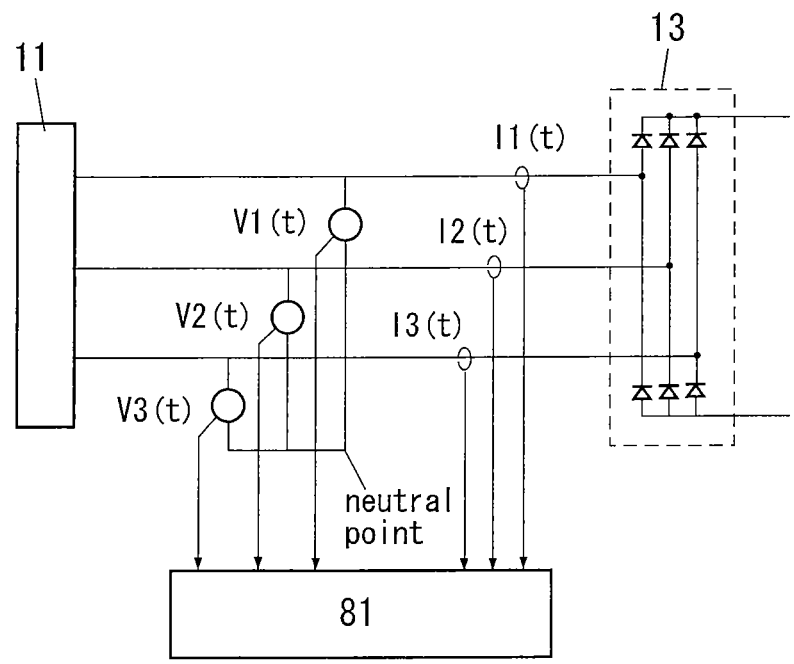
FIG. 19 illustrates another configuration of a voltage measuring device and a current measuring device.

FIG. 19 illustrates another configuration of a voltage measuring device and a current measuring device.

In the above-stated Embodiments 1, 2, 3, 4, 7 and 8, instead of measuring voltage and current of a DC bus with the voltage measuring device and the current measuring device, voltages (with reference to a neutral point) and currents of the respective phases of three-phase AC may be measured between the external power source 11 and the converter 13 as illustrated in FIG. 19. The measured voltages and currents are input to the electric power amount calculator, and the product of the voltage and current of each phase is summed across three phases to find electric power. Then, temporal integration is performed for the electric power to be an electric power amount in one cycle. That is, letting that the voltage measurement values for the respective phases be $V1(t)$, $V2(t)$ and $V3(t)$ and the current measurement values be $I1(t)$, $I2(t)$ and $I3(t)$, then $P(t)$ will be given by Expression (7) instead of Expression (1) or Expression (3).

$$P(t) = V1(t) \times I1(t) + V2(t) \times I2(t) + V3(t) \times I3(t) \quad (7)$$

In Embodiments 1, 2 and 7, the electric power amount calculator may perform calculation using the expression obtained by substituting this Expression (7) into Expression (2).

In Embodiments 3, 4 and 8, the electric power amount calculator may perform calculation using the expression obtained by substituting this Expression (7) into Expressions (4), (5) and (6).

In order to reduce measurement error, when a parameter (or parameters) is searched for and decided, a parameter (or parameters) may be changed not every one cycle but every N cycles (N is two or more), and an electric power amount in one cycle or an electric power amount in one section measured for each of the N cycles may be averaged over N cycles. In this case, such an averaged electric power amount is found for each parameter, the smallest one is specified among these obtained electric power amounts, and the device may be operated with a parameter value corresponding to the specified electric power amount.

(Method to Division of Sections)

Figure 20:
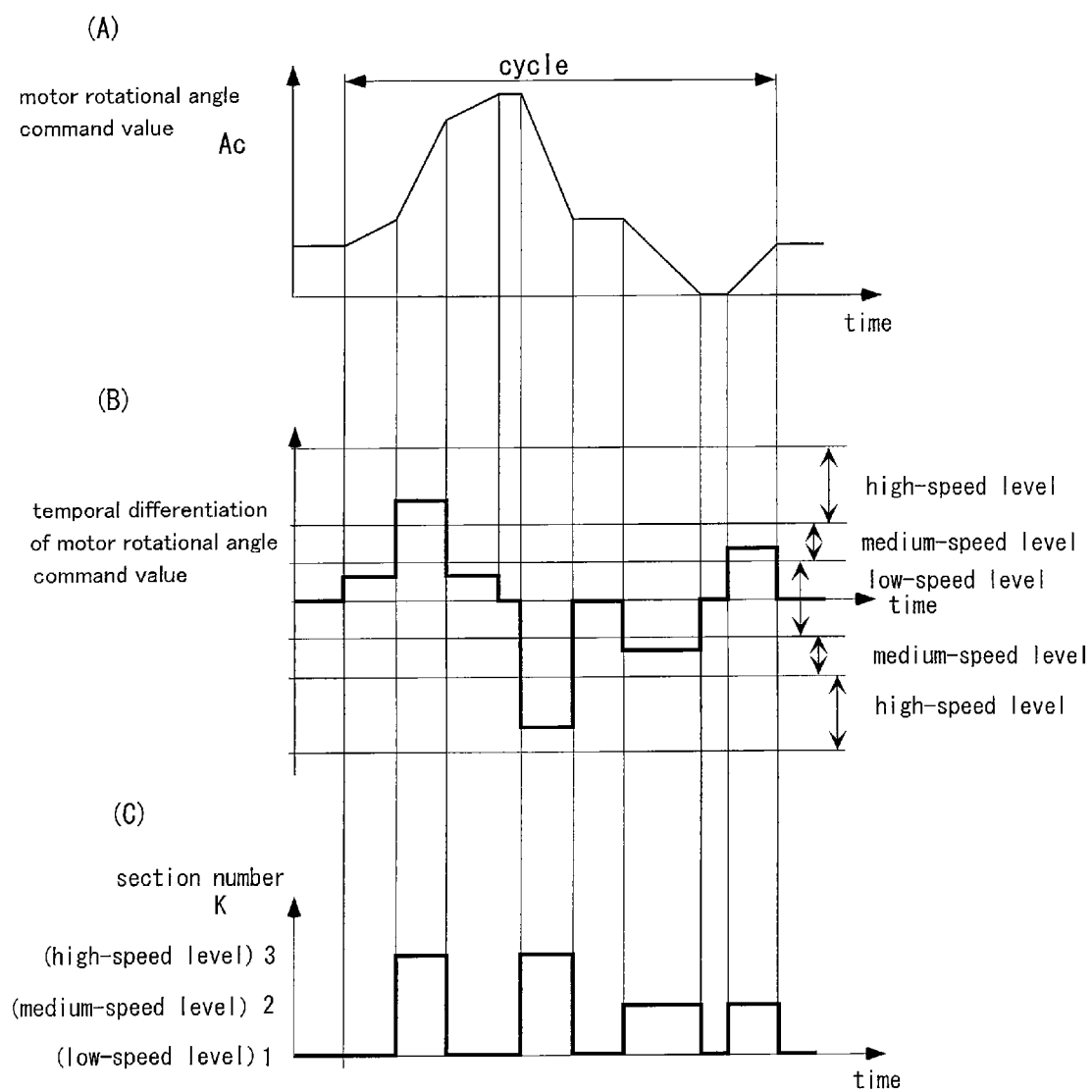
FIG. 20 illustrates an exemplary way to divide a cycle into sections.

FIG. 20 illustrates an exemplary way to divide a cycle into sections.

In the present invention, the following method is available as a method to divide one cycle into a plurality of sections each having a greatly different operating condition.

A. When a load pattern (motor rotational angle command value or motor rotational speed command value) is given, human judges to divide one cycle into sections and decides a section number for each section. Especially, in the case where a human decides a load pattern itself, it is reasonable to decide a load pattern as well as section division at the same time.

B. When a load pattern (motor rotational angle command value or motor rotational speed command value) is given, one cycle is divided automatically into sections based on values of speed and acceleration.

For instance, when a load pattern (in this example, a motor rotational angle command value) as illustrated in FIG. 20A is given, temporal differentiation of the load pattern is calculated, whereby speed is found as illustrated in FIG. 20B. The speed is classified into a low-speed level, a medium-speed level and a high-speed level that are decided beforehand, and the low-speed level, the medium-speed level and the high-speed level will be designated as section 1, section 2 and section 3, respectively, as in FIG. 20C, whereby one cycle is divided into sections, and a section number is decided for each section. As a method to decide a low-speed level, a medium-speed level and a high-speed level beforehand, less than 30% of Vmax is decided as a low-speed level, 30% or more and less than 60% of Vmax is decided as a medium-speed level, and 60% or more of Vmax is decided as a high-speed level, while setting a rated maximum speed as Vmax.

The above-stated Embodiments use a voltage-type inverter. However, the present invention is applicable as long as voltage or current fed to a motor is controlled by switching of a power control device. For instance, the present invention is applicable to the case using a current-type inverter, a voltage-type or current-type multilevel inverter, a matrix converter including integrated converter and inverter, a multi-level matrix converter or the like. When the matrix converter is used, as the matrix converter does not have DC bus, voltage and current may be measured for three-phase AC immediately after the external power source 11 as illustrated in FIG. 1, for example.

The motor 21 may be a linear motor instead of the rotational motor.

Instead of the motor encoder, a rotary encoder and a linear encoder that directly detect a position and a speed of the mechanical load may be used.

Instead of the combination of the external power source and the converter, electric power may be supplied directly to a DC bus from a DC power source (a DC generator, a fuel cell, a battery or the like).

The above describes the example of sensor-less vector control by a three-phase induction or a synchronous motor. Instead, this may be vector control using a rotational speed detection sensor in the three-phase induction motor or vector control using a rotational angle detection sensor in the three-phase induction motor.

The external power source may be a wireless power transfer system. The wireless power transfer system may include a converter.

The above-stated embodiments assume the method of deciding ON/OFF of a notch wave based on a comparison of the magnitude between a modulation wave and a carrier wave in a PWM modulator. On the other hand, when a modulation method using the concept of Instantaneous Space Vector exemplified in Non-Patent Document 1, a DSP or a microcomputer making up a PWM modulator may be interrupted at a timing of a rising edge of a carrier wave as a square wave, thus configuring so that vector operation is once performed for one period of the carrier wave.

DESCRIPTION OF REFERENCE NUMBERS

11 external power source, 13 converter, 15 DC bus,
17 capacitor, 19, 19A, 19B, 19C inverter
21, 21A, 21B, 21C motor
23, 23A, 23B, 23C mechanical load (same load pattern device)
25, 25A, 25B, 25C motor encoder
27, 27A, 27B, 27C controller
29, 29A, 29B, 29C command value generator
41 power controller, 43 motor current measuring device
45 command calculator, 47 PWM modulator, 49 carrier wave oscillator
51, 51*a* gate drive circuit
61, 61A, 61B, 61C voltage measuring device
63, 63A, 63B, 63C current measuring device
81, 81A, 81B, 81C electric power amount calculator
83, 83*a*, 83*a*A, 83*a*B, 83*a*C parameter selection and command device

The invention claimed is:

1. A power-saving driving device for a device that is driven by a motor receiving electric power from an inverter and that has a same load pattern, wherein the power-saving driving device comprises:
   (a) a voltage measuring device that measures a voltage received by the inverter;
   (b) a current measuring device that measures a current received by the inverter;
   (c) an electric power amount calculator that calculates, based on the measured voltage and the measured current, a received electric power amount that is received by the inverter in the same load pattern; and
   (d) a parameter selection and command device that makes a parameter or parameters of the inverter change to a plurality of values in respective cycles having the same load pattern,
   wherein the parameter selection and command device compares with each other a plurality of the received electric power amounts respectively corresponding to the plurality of values of the parameter or parameters and respectively corresponding to the respective cycles, and the parameter selection and command device selects, from the plurality of values, a first parameter value corresponding to the lowest of the plurality of the received electric power amounts respectively calculated based on the measured voltages and the measured currents, and issues the selected first parameter value as a command to the inverter.

2. The power-saving driving device according to claim 1, further comprising:
(e) a command value generator that outputs a cycle start signal and a cycle end signal of the load pattern.

3. The power-saving driving device according to claim 2, wherein the parameter or parameters of the inverter is either or both of a carrier wave frequency and a voltage change rate of a switching waveform.

4. A method for power-saving driving of a device that is driven by a motor receiving electric power from an inverter and that has a same load pattern, wherein the method comprises the steps of:
(a) making a parameter or parameters of the inverter change to a plurality of values in respective cycles having the same load pattern;
(b) measuring a voltage received by the inverter;
(c) measuring a current received by the inverter;
(d) calculating, based on the measured voltage and the measured current, a received electric power amount that is received by the inverter in the same load pattern; and
(e) comparing a plurality of the received electric power amounts respectively corresponding to the plurality of values of the parameter or parameters and respectively corresponding to the respective cycles, selecting, from the plurality of values, a first parameter value corresponding to the lowest of the plurality of the received electric power amounts respectively calculated based on the measured voltages and the measured currents, and issuing the selected first parameter value as a command to the inverter.

5. The method for power-saving driving according to claim 4, wherein the received electric power amount is calculated by an electric power amount calculator of a power-saving driving device, wherein the electric power amount calculator comprises a microcomputer.

6. The power-saving driving device according to claim 1, wherein the parameter or parameters of the inverter is either or both of a carrier wave frequency and a voltage change rate of a switching waveform.

7. The power-saving driving device according to claim 1, wherein the electric power amount calculator comprises a microcomputer.

8. A power-saving driving device for an device that is driven by a motor receiving electric power from an inverter and that has a same load pattern, wherein the power-saving driving device comprises:
(a) a voltage measuring device that measures a voltage received by the inverter;
(b) a current measuring device that measures a current received by the inverter;
(c) an electric power amount calculator that calculates, based on the measured voltage and the measured current, a received electric power amount that is received by the inverter for each of a plurality of sections in the same load pattern; and
(d) a parameter selection and command device that makes a parameter or parameters of the inverter change to a plurality of values in respective cycles having the same load pattern, wherein the parameter selection and command device compares a plurality of the received electric power amounts respectively corresponding to the plurality of values of the parameter or parameters and respectively corresponding to the respective cycles, and the parameter selection and command device selects, from the plurality of values, a first parameter value corresponding to the lowest of the plurality of the received electric power amounts respectively calculated based on the measured voltages and the measured currents, and issues the selected first parameter value as a command to the inverter.

9. The power-saving driving device according to claim 8, further comprising:
(e) a command value generator that outputs a cycle start signal and a cycle end signal of the load pattern, and the command value generator generates a section number indicating each section in the load pattern.

10. The power-saving driving device according to claim 9, wherein the parameter or parameters of the inverter is either or both of a carrier wave frequency and a voltage change rate of a switching waveform.

11. The power-saving driving device according to claim 8, wherein the parameter or parameters of the inverter is either or both of a carrier wave frequency and a voltage change rate of a switching waveform.

12. The power-saving driving device according to claim 8, wherein the electric power amount calculator comprises a microcomputer.

13. A method for power-saving driving of a device that is driven by a motor receiving electric power from an inverter and that has a same load pattern, wherein the method comprises the steps of:
(a) making a parameter or parameters of the inverter change to a plurality of values in respective cycles having the same load pattern;
(b) measuring a voltage received by the inverter;
(c) measuring a current received by the inverter;
(d) calculating, based on the measured voltage and the measured current, a received electric power amount that is received by the inverter for each of a plurality of sections in the same load pattern; and
(e) comparing a plurality of the received electric power amounts respectively corresponding to the plurality of values of the parameter or parameters and respectively corresponding to the respective cycles, selecting, from the plurality of values, a first parameter value corresponding to the lowest of the plurality of the received electric power amounts respectively calculated based on the measured voltages and the measured currents, and issuing the selected first parameter value as a command to the inverter.

14. The method for power-saving driving according to claim 13, wherein the plurality of sections are set so that each section has a different speed, acceleration or torque of the motor in the load pattern.

15. The method for power-saving driving according to claim 13, wherein the received electric power amount is calculated by an electric power amount calculator of a power-saving driving device, wherein the electric power amount calculator comprises a microcomputer.

* * * * *